United States Patent [19]

Ohsawa

[11] Patent Number: 5,666,570

[45] Date of Patent: Sep. 9, 1997

[54] CAMERA

[75] Inventor: Toshifumi Ohsawa, Tokyo, Japan

[73] Assignee: Canon Kabushiki Kaisha, Tokyo, Japan

[21] Appl. No.: 729,075

[22] Filed: Oct. 10, 1996

Related U.S. Application Data

[63] Continuation of Ser. No. 286,802, Aug. 5, 1994, abandoned, which is a continuation of Ser. No. 27,289, Mar. 4, 1993, abandoned.

[30] Foreign Application Priority Data

Mar. 6, 1992 [JP] Japan .................................. 4-082986

[51] Int. Cl.$^6$ ................................................ G03B 17/18
[52] U.S. Cl. ........................... 396/147; 396/223; 396/290
[58] Field of Search ............................. 396/88, 147, 223, 396/290

[56] References Cited

U.S. PATENT DOCUMENTS 3,839,724 10/1974 Muryoi ............................. 354/195.13
4,341,451 7/1982 Krueger et al. .................. 354/289.1 X
4,692,008 9/1987 Arakawa et al. ............... 354/289.12 X Primary Examiner—W. B. Perkey
Attorney, Agent, or Firm—Robin, Blecker, Daley and Driscoll

[57] ABSTRACT

A camera comprises a lens optical system including a zooming lens, a photographic mode setting circuit capable of selectively setting a plurality of kinds of photographic modes, exposure conditions being individually set for the respective photographic modes, a driving circuit for causing the zooming lens to move, a focus adjusting circuit for performing focus adjustment of the lens optical system, and a controlling circuit for controlling the driving circuit in accordance with a particular photographic mode set by the photographic mode setting circuit and forcedly moving the zooming lens to a position corresponding to a predetermined focal length, the controlling circuit moving the zooming lens before an operation of the focus adjusting circuit.

12 Claims, 14 Drawing Sheets

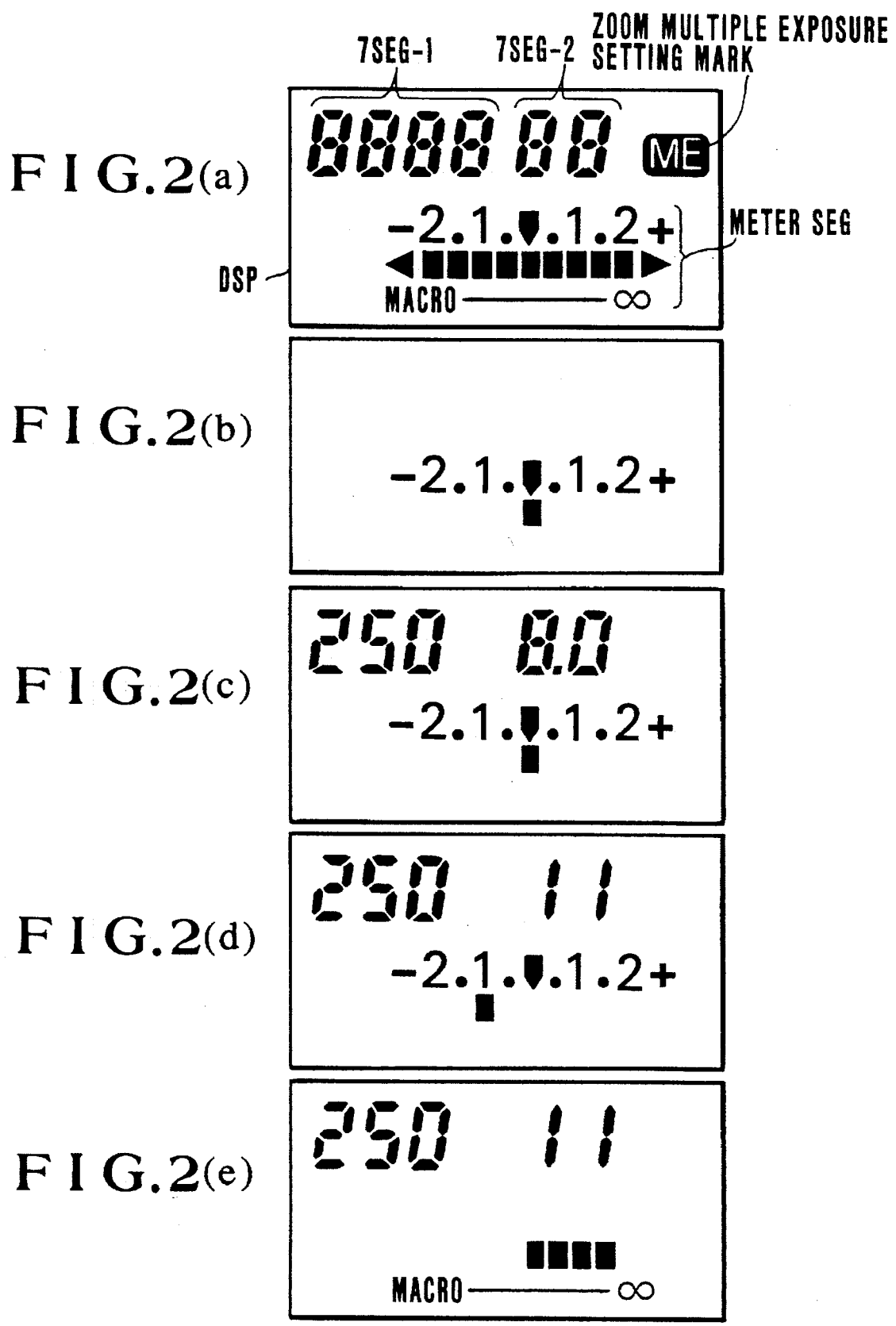

CAMERA

This is a continuation application under 37 CFR 1.62 of prior application Ser. No. 08/286,802 filed on Aug. 5, 1994, which is a continuation of application Ser. No. 08/027,289 filed on Mar. 4, 1993, both abandoned.

BACKGROUND OF THE INVENTION

1. Field of the Invention

The present invention relates to a camera capable of carrying out various types of zooming control.

2. Description of the Related Art

It has conventionally been proposed to provide a camera having photographic modes designed for a number of specific photographic conditions, such as a portrait mode, a landscape mode and a close-up mode.

In a camera having such photographic modes, exposure is programmed so that various photographs which individually match the specific photographic conditions can be automatically produced, as by altering exposure conditions while taking account of the specific photographic conditions. However, it has not yet been proposed to automate the process of determining angles of view which individually match the specific photographic conditions, and there is the problem that a user occasionally fails to take a photograph which matches a specific photographic condition selected by the user.

A second problem to be solved by the present invention is described below.

Conventionally, there are known arts for automatically taking a fantastic or nonrealistic photograph while causing a focusing lens or a zooming lens to operate during an exposure cycle, or for creating a similar effect by performing multiple exposure while changing the position of focus.

However, it has not yet been proposed to provide a camera in which the process of effecting multiple exposure while changing the magnification of a subject to be photographed is automated so that it is possible to achieve a further photographic effect by utilizing such a known photographic art.

A third problem to be solved by the present invention is described below.

Conventionally, in the field of zoom lenses used for photography or other purposes, including zoom lens arrangements which are achieved in combination with cameras, it has been proposed to provide automated or electrically powered focusing or zooming for the purpose of enhancing operability or response speed during photography.

However, with a camera having such automated focusing or zooming, it is still difficult for a photographer to take a photograph which perfectly reflects an angle of view or a state of focus according to the photographic intention of the photographer. There are some cases where the photographer needs to manually perform focusing or zooming. As a result, if the photographer encounters a sudden shutter opportunity, he may miss the shutter opportunity because of a loss of time due to manual focusing or zooming. It is, therefore, desired to solve this problem. Incidentally, a proposal for automatically moving a focusing lens to a preset focus position (U.S. Pat. No. 4,783,676) and a proposal for automatically moving a zooming lens to a preset zoom position (U.S. Pat. No. 5,065,172) have been known.

A fourth problem to be solved by the present invention is described below.

Conventionally, photographic lenses for cameras have a depth-of-field scale, or the cameras have a reduced-aperture preview function for confirming a depth-of-field on a viewfinder screen.

However, in recent years, it has become common practice to omit such a depth-of-field scale or such a reduced-aperture preview function for the purpose of cost savings. Further, if a user of a camera having such a function is not a skilled photographer, it is difficult to fully utilize the function.

SUMMARY OF THE INVENTION

A first object of the present invention is to provide a camera capable of determining an angle of view which matches a selected one of specific photographic conditions without the need for a photographer to perform a particular operation each time the photographer selects a desired specific photographic condition.

A second object of the present invention is to provide a camera capable of easily realizing photography utilizing a special photographic effect without the need to force a photographer to perform a complicated operation.

A third object of the present invention is to provide a camera which permits even an inexperienced photographer to easily grasp an image of a depth-of-field state.

A fourth object of the present invention is to provide a camera capable of immediately executing photography based on intended focus and zoom positions without loss of time since a photographer does not need to perform a focusing or zooming operation each time an angle of view is to be changed.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIGS. 2(a) to 2(e) are views showing visual-display examples displayed on the display shown in FIG. 1;

DETAILED DESCRIPTION OF THE PREFERRED EMBODIMENT

A preferred embodiment of the present invention will be described below with reference to the accompanying drawings.

Figure 1:
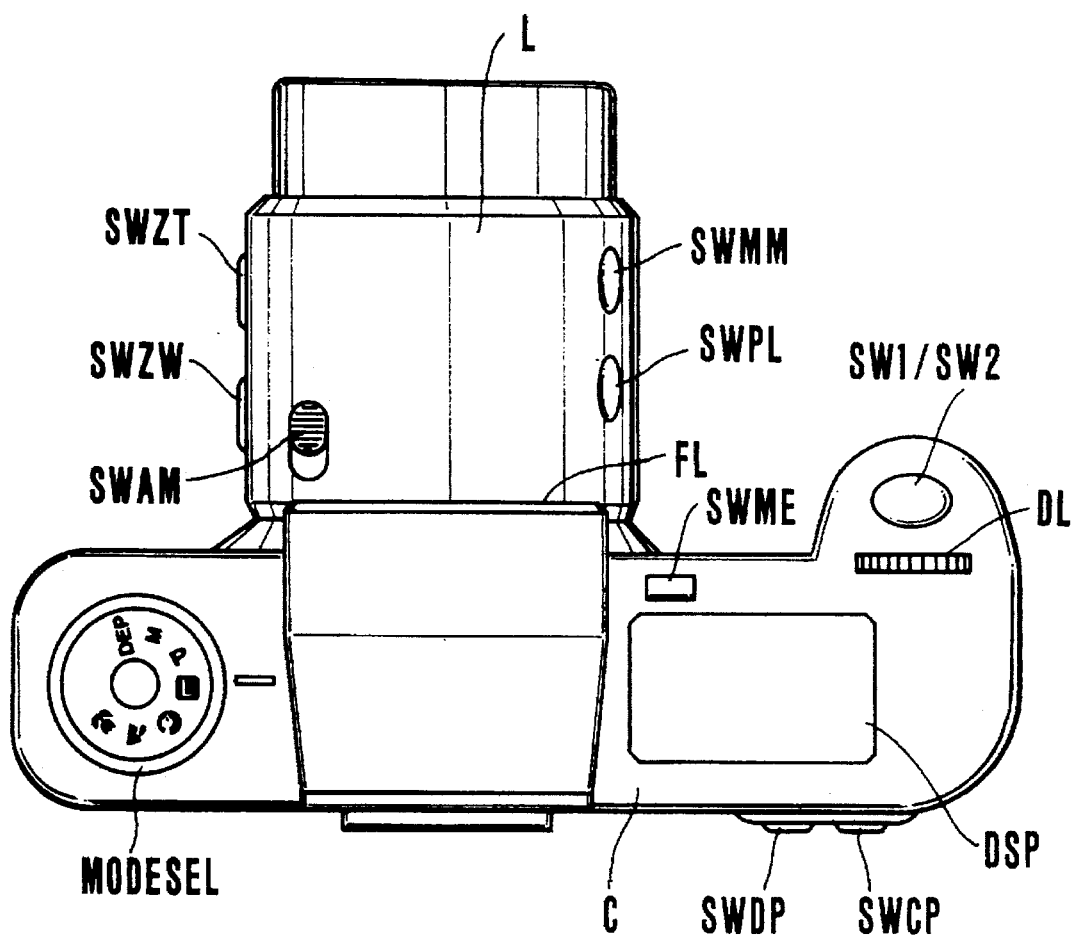
FIG. 1 is a diagrammatic, top plan view showing a camera provided with a zoom lens assembly according to one embodiment of the present invention.

FIG. 1 is a schematic top plan view of the external appearance of a camera provided with a zoom lens assembly according to one embodiment of the present invention.

The camera shown in FIG. 1 includes a telephoto-side zoom switch SWZT, a wide-angle-side zoom switch SWZW, an autofocus/manual-focus selecting switch SWAM, a lens-position memory switch SWMM and a lens-position reproduction switch These operating members are provided on a zoom lens assembly L.

The camera shown in FIG. 1 also includes a zoom multiple exposure mode setting switch SWME, a switch SW1 which is turned on at a first stroke of a release button, a switch SW2 which is turned on at a second stroke of the release button, an electronic dial DL which is rotated to generate two-phase pulses which are 90 degrees out of phase with each other, a selector dial MODESEL for selecting a desired operating mode from among a plurality of operating modes of the camera, a depth display switch SWDP, and an exposure compensation switch SWCP.

These operating members are provided on a camera body C.

The camera body C also includes a display DSP and a flash unit FL.

The selector dial MODESEL for selecting a desired operating mode of the camera will be described below.

The selector dial MODESEL is provided with seven positions, such as "DEP", "M", . . . , as shown in FIG. 1. The seven positions are arranged in the following manner: "DEP" represents a depth priority AE mode; "M" represents a manual exposure mode; "P" represents a program AE mode; "L" represents a release lock position (a camera-operation disabling position); "a mark (pictorial character) of a human face" represents a portrait photography AE mode; "a pictorial character of a mountain" represents a landscape photography AE mode; and a pictorial character of a tulip represents a close-up photography AE mode.

In the following description, the portrait photography AE mode, the landscape photography AE mode and the close-up photography AE mode which are represented by the respective pictorial characters are hereinafter referred to as "image select mode(s)" since a user can photograph an image associated with a selected one of the pictorial characters by selecting a desired mode from among the aforesaid three modes.

FIGS. 2(a) to 2(e) and 3(a) to 3(e) are views showing visual-display examples displayed on the display DSP.

FIG. 2(a) shows the state in which all segments of the display DSP are turned on. The segments are made up of a 7-segment group 7SEG-1 for primarily displaying shutter speed information, a 7-segment group 7SEG-2 for primarily displaying aperture value information, a segment group METER SEG for displaying an exposure level and depth image information, and a zoom multiple exposure setting mark.

The visual-display examples shown in FIGS. 2(b) to 2(e) and 3(a) to 3(e) will be referred to in the following description, as required.

Figure 4:
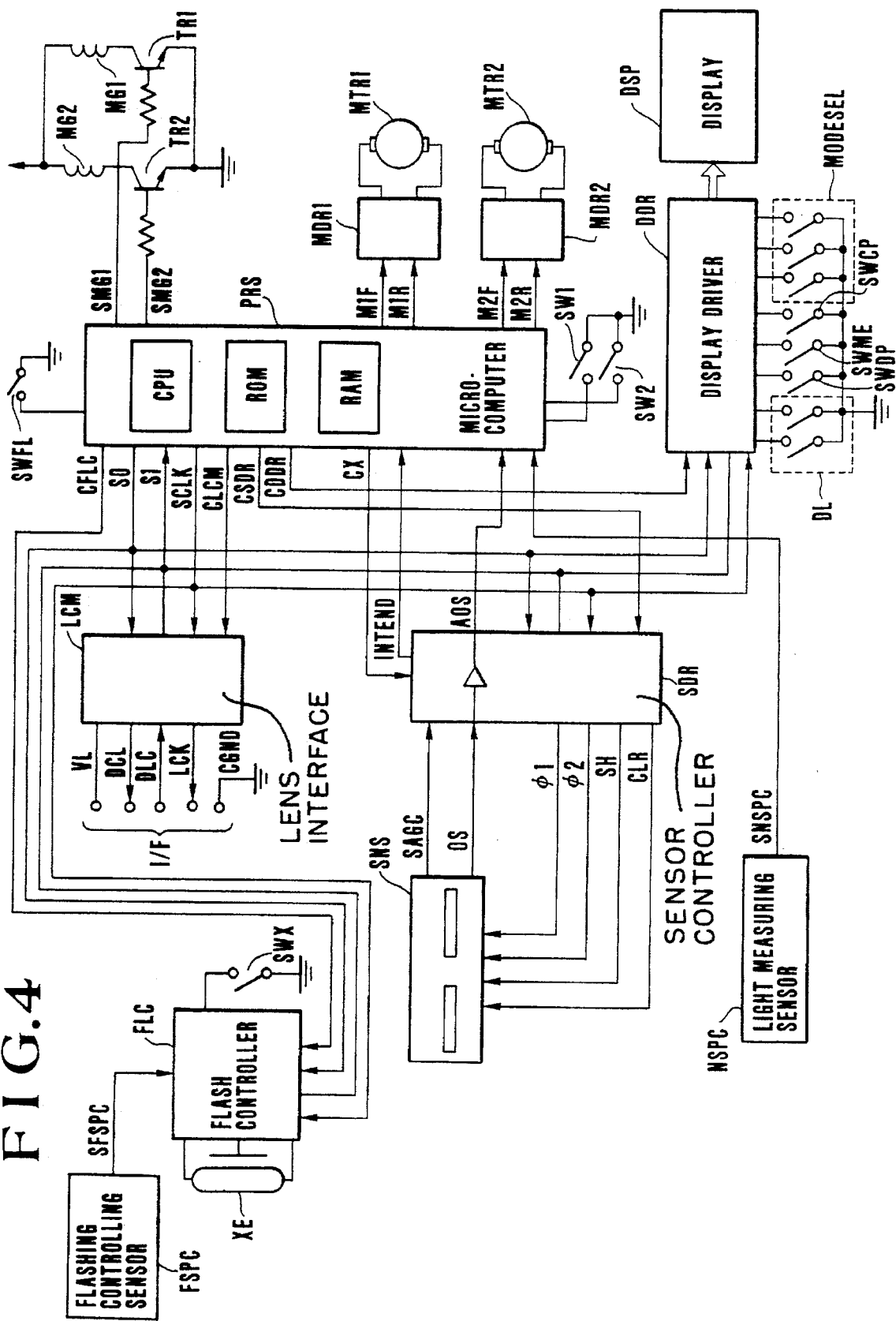
FIG. 4 is a block diagram showing the circuit construction of the camera body shown in FIG. 1.

FIG. 4 is a block diagram showing the construction of an electrical circuit provided in the camera according to the embodiment shown in FIG. 1.

The electrical circuit shown in FIG. 4 includes a microcomputer PRS for performing control of the camera as well as the computations required for light measurement, focus detection and the like, a display driver DDR for performing display control of the display DSP as well as detection of a switch input, a light measuring sensor NSPC for measuring a subject luminance for the purpose of exposure control, a focus detecting sensor SNS made up of two line sensors for detecting the amount of deviation of focus, and a sensor controller SDR for controlling storage of a signal into the focus detecting sensor SNS as well as for providing interfacing during reading of a signal stored in the focus detecting sensor SNS.

The electrical circuit shown in FIG. 4 also includes a lens interface LCM for interfacing the microcomputer PRS and the zoom lens assembly L while the microcomputer PRS is performing communication with the zoom lens assembly L, a flash controller FLC for performing flashing control of a flash unit, a xenon tube XE which serves as an emission body of the flash unit, a flashing controlling sensor FSPC for detecting the amount of flashing of the flash unit and performing flashing control, a trigger switch SWX which is turned on upon completion of a running of a shutter leading curtain to send a flashing trigger to the flash controller FLC, and a flash detecting switch SWFL which is turned on when a flash part is moved up (popped up) and flash photography is ready.

The electrical circuit shown in FIG. 4 also includes a shutter leading curtain controlling magnet MG1 and a shutter trailing curtain controlling magnet MG2, transistors TR1 and TR2 for controlling energization and de-energization of the respective magnets MG1 and MG2, a motor MTR1 for winding and rewinding a film, a motor driver MDR1 for driving the motor MTR1, a motor MTR2 for charging a mechanism as well as for moving up and down a mirror, and a motor driver MDR2 for driving the motor MTR2.

The switches SW1 and SW2, which are connected to the microcomputer PRS, as well as the switches DL, SWME, SWCP and MODESEL, which are connected to the display driver DDR, correspond to the camera-body-side operating members described previously in connection with FIG. 1, and in FIGS. 1 and 4 the same symbols are used to denote the same members. As described previously, the selector dial MODESEL has seven positions, and each of the positions is represented by a digital signal indicative of 3-bit switch information as shown in FIG. 4.

The microcomputer PRS communicates information with individual devices by serial communication, such as the display driver DDR, the sensor controller SDR, the lens interface LCM and the flash controller FLC. Signals associated with such information communication will be described below.

A signal SO is a data signal which is outputted from the microcomputer PRS to each of the devices. A signal SI is a data signal which is inputted from each of the devices to the microcomputer PRS. A signal SCLK is a communication synchronizing clock signal which is outputted from the microcomputer PRS to each of the devices. When the microcomputer PRS is to communicate with the display driver DDR, the microcomputer PRS outputs a chip select signal CDDR to the display driver DDR. When the microcomputer PRS is to communicate with the sensor controller SDR, the microcomputer PRS outputs a chip select signal CSDR to the sensor controller SDR. When the microcomputer PRS is to communicate with the zoom lens assembly L, the microcomputer PRS outputs a chip select signal CLCM to the zoom lens assembly L. When the microcomputer PRS is to communicate with the flash controller FLC, the microcomputer PRS outputs a chip select signal CFLC to the flash controller FLC.

When the microcomputer PRS is to control a shutter, the microcomputer PRS outputs signals SMG1 and SMG2 to control the energization and de-energization of the transistors TR1 and TR2. When the microcomputer PRS is to control film transport, the microcomputer PRS outputs signals M1F and M1R to drive the motor MTR1. When a mechanism charging operation and a mirror-up or mirror-down operation are to be executed, the microcomputer PRS outputs signals M2F and M2R to drive the motor MTR2.

The lens interface LCM has a contact part for connection to the zoom lens assembly L, as indicated by "I/F" in FIG. 4. The contact part I/F has a power source line VL for supplying electrical power to the zoom lens assembly L, a communication data line DCL for communicating data from the camera body C to the zoom lens assembly L, a communication data line DLC for communicating data from the zoom lens assembly L to the camera body C, a communication synchronizing clock line LCK for transmitting a synchronizing clock signal from the camera body C to the zoom lens assembly L, and a ground line CGND.

Figure 5:
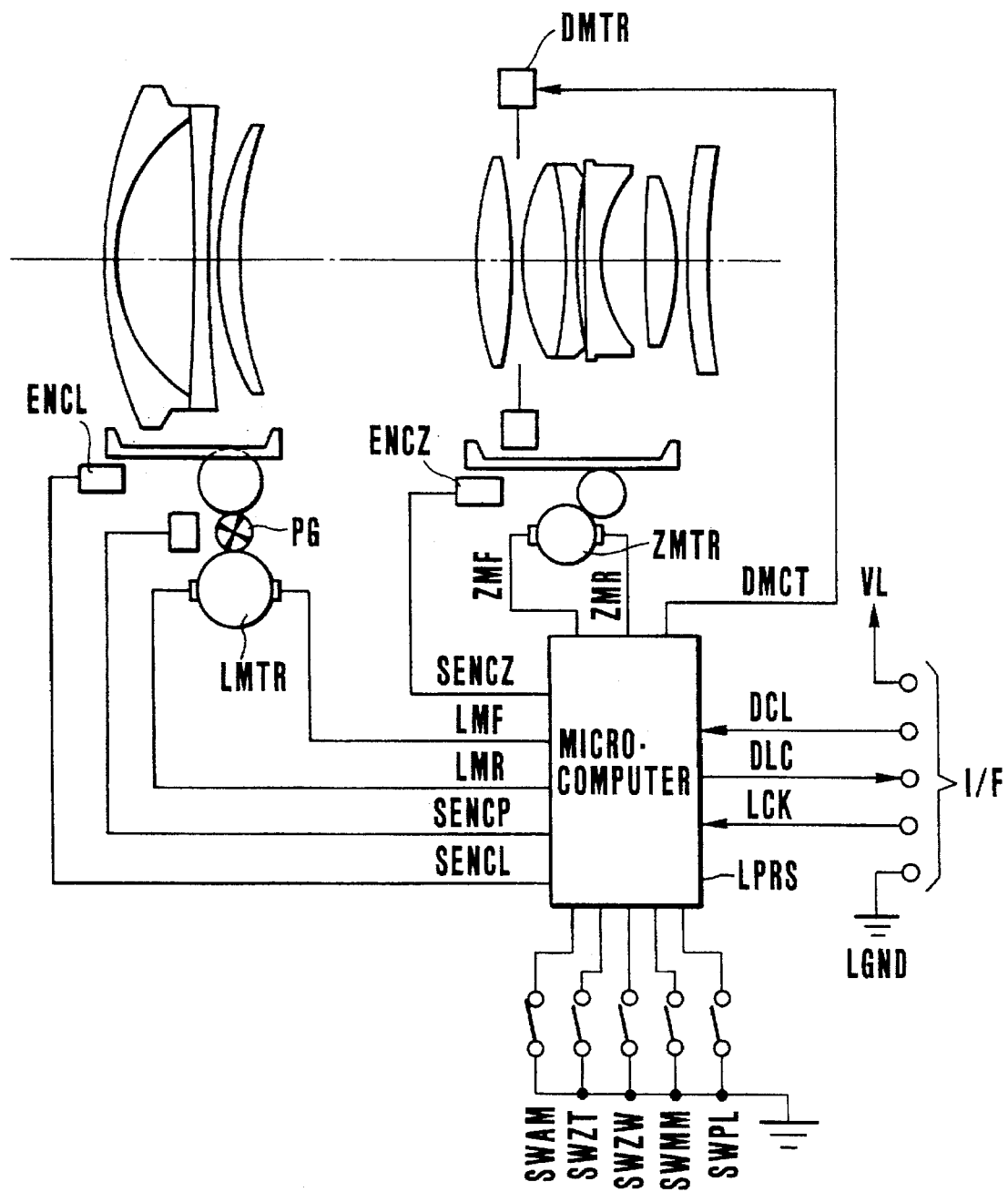
FIG. 5 is a schematic block diagram showing the optical arrangement and the circuit construction of the zoom lens assembly shown in FIG. 1.

FIG. 5 is a schematic view showing the electrical circuit and the optical arrangement of the zoom lens assembly L, and the electrical circuit will be referred to below.

A lens-side microcomputer LPRS performs control of the zoom lens assembly L or memorizes various data such as optical data on the zoom lens assembly L. The switches SWAM, SWZT, SWZW, SWMM and SWPL which are connected to the lens-side microcomputer LPRS correspond to the operating members of the zoom lens assembly L which have been described previously in connection with FIG. 1, and in FIGS. 1 and 5 the same symbols are used to denote the same members.

The electrical circuit shown in FIG. 5 includes a contact part I/F for connection to the contact part I/F of the camera body C shown in FIG. 4, a power source line VL for supplying electrical power to the zoom lens assembly L, a communication data line DCL for communicating data from the camera body C to the zoom lens assembly L, a communication data line DLC for communicating data from the zoom lens assembly L to the camera body C, a communication synchronizing clock line LCK for transmitting a synchronizing clock signal from the camera body C to the zoom lens assembly L, and a ground line LGND. A focusing-lens driving motor LMTR is controlled by signals LMF and LMR outputted from the lens-side microcomputer LPRS. The movement of a focusing lens can be finely controlled by the lens-side microcomputer LPRS by using signals SENCP and SENCL which are respectively obtained from a pulse encoder PG for detecting the rotation of the focusing-lens driving motor LMTR and an encoder ENCL for detecting the position of the focusing lens. A zooming-lens driving motor ZMTR is controlled by signals ZMF and ZMR outputted from the lens-side microcomputer LPRS, and the movement of the zooming lens can be detected by the lens-side microcomputer LPRS by using a signal SENCZ obtained from an encoder ENCZ for detecting the position of the zooming lens. A diaphragm driving motor DMTR is controlled by a signal DMCT outputted by the lens-side microcomputer LPRS.

The operations of the microcomputers PRS and LPRS will be described below with reference to the flowchart of FIG. 6.

When electrical power is supplied to the electrical circuit of the camera body C to start up the microcomputer PRS, the microcomputer PRS starts its operation with Step 1 in accordance with a program built in the microcomputer PRS.

[Step 1] The microcomputer PRS initializes the output of each of its ports, each flag on its memory, and its registers.

[Step 2] It is checked whether the position of the selector dial MODESEL is "L", i.e., the release lock position. If the position of the selector dial MODESEL is "L", the process proceeds to Step 3; otherwise, the process proceeds to Step 7.

[Step 3] The microcomputer PRS communicates with the display driver DDR to turn off all information displayed on the display DSP.

[Step 4] The microcomputer PRS communicates with the lens-side microcomputer LPRS to disable the lens-side microcomputer LPRS from accepting any operating instruction from the telephoto-side zoom switch SWZT and the wide-angle-side zoom switch SWZW. The associated operation of the lens-side microcomputer LPRS will be described later in detail.

[Step 5] The microcomputer PRS communicates with the lens-side microcomputer LPRS to disable the lens-side microcomputer LPRS from accepting any operating instruction from the lens-position memory switch SWMM and the lens-position reproduction switch SWPL.

[Step 6] The microcomputer PRS clears a depth priority completion flag FDEP and a zoom multiple exposure mode setting flag FME. Since all the flags have just been initialized in Step 1, it follows that the depth priority completion flag FDEP and the zoom multiple exposure mode setting flag FME have been cleared. However, during an operation of the camera, if the position of the selector dial MODESEL is set to "L", this step becomes valid. After that, the program returns to Step 2, and as long as the position of the selector dial MODESEL is "L", the above-described steps are only repeated. Accordingly, as long as the release lock position is selected, the camera does not operate.

If it is determined in Step 2 that any position other than "L" is selected by the selector dial MODESEL, the process proceeds to Step 7 as described previously.

[Step 7] The microcomputer PRS communicates with the lens-side microcomputer LPRS to obtain the information required for light measurement and focus detection, such as optical data on the zoom lens assembly L.

[Step 8] The microcomputer PRS communicates with the lens-side microcomputer LPRS to enable the lens-side microcomputer LPRS from accepting an operating instruction from the telephoto-side zoom switch SWZT and the wide-angle-side zoom switch SWZW. After this step has been executed, the user of the camera can zoom the zoom lens assembly L by operating the telephoto-side zoom switch SWZT and the wide-angle-side zoom switch SWZW which are provided on the zoom lens assembly L.

[Step 9] The microcomputer PRS communicates with the lens-side microcomputer LPRS to enable the lens-side microcomputer LPRS to accept an operating instruction from the lens-position memory switch SWMM and the lens-position reproduction switch SWPL. After this step has been executed, the user of the camera can carry out memorization of a lens position and reproduction of the memorized lens position by operating the lens-position memory switch SWMM and the lens-position reproduction switch SWPL which are provided on the zoom lens assembly L. This step will be described in detail later.

[Step 10] It is checked whether the position of the selector dial MODESEL is "M", i.e., the manual exposure mode. If the manual exposure mode is not selected, the process proceeds to Step 11.

[Step 11] The microcomputer PRS communicates with the display driver DDR to display exposure compensation information on the display DSP by means of the segment group METER SEG. Since the initialization has just been performed in Step 1, the value of exposure compensation is "0". Accordingly, the state of a visual display provided on the display DSP at this time is as shown in FIG. 2(b).

[Step 12] It is checked whether the position of the selector dial MODESEL is "P", i.e., the program AE mode. If "P" is not selected, the process proceeds to Step 13.

[Step 13] It is checked whether the position of the selector dial MODESEL is "DEP", i.e., the depth priority AE mode. If "DEP" is not selected, the process proceeds to Step 14.

[Step 14] The process comes to this step if the position of the selector dial MODESEL corresponds to any of the image select modes (the portrait photography AE mode, the landscape photography AE mode or the close-up photography AE mode). In this case, in order that the focal length of the zoom lens assembly L be set through the camera body C to make it easy to take a photograph which matches an image according to each of the image select modes, the microcomputer PRS communicates with the lens-side microcomputer LPRS to temporarily disable the lens-side microcomputer LPRS from accepting any operating instruction from the telephoto-side zoom switch SWZT and the wide-angle-side zoom switch SWZW.

[Step 15] For the same reason as that described in Step 14, the microcomputer PRS communicates with the lens-side microcomputer LPRS to temporarily disable the lens-side microcomputer LPRS from accepting any operating instruction from the lens-position memory switch SWMM and the lens-position reproduction switch SWPL. Then, the process proceeds to Step 16 of FIG. 7.

[Step 16] It is checked whether the position of the selector dial MODESEL is the landscape photography AE mode. If the landscape photography AE mode is not selected, the process proceeds to Step 17.

[Step 17] It is checked whether the position of the selector dial MODESEL is the close-up photography AE mode. If the close-up photography AE mode is not selected, it is determined that the portrait photography AE mode is selected, and the process proceeds to Step 18.

[Step 18] The microcomputer PRS communicates with the lens-side microcomputer LPRS to instruct it to set the zoom lens assembly L to a focal length of 100 mm which is suitable for portrait photography. However, if 100 mm is not contained in the range of focal lengths of the attached zoom lens assembly L, the microcomputer PRS instructs the lens-side microcomputer LPRS to select a focal length closest to 100 mm from the range and set the zoom lens assembly L to the selected focal length.

[Step 19] The microcomputer PRS communicates with the lens-side microcomputer LPRS to release it from the state of being temporarily disabled from accepting any operating instruction from the telephoto-side zoom switch SWZT and the wide-angle-side zoom switch SWZW. After this step has been executed, the user of the camera can again zoom the zoom lens assembly L by operating the telephoto-side zoom switch SWZT and the wide-angle-side zoom switch SWZW which are provided on the zoom lens assembly L. Accordingly, if the user desires to take a photograph which reflects his photographic intention, the user can select a focal length other than that set by the camera.

[Step 20] The microcomputer PRS communicates with the lens-side microcomputer LPRS to release it from the state of being temporarily disabled from accepting any operating instruction from the lens-position memory switch SWMM and the lens-position reproduction switch SWPL.

In the above description, reference has been made to the manner of setting a focal length if the portrait photography AE mode is selected. If the close-up photography AE mode is selected, the process proceeds from Step 17 to Step 21.

[Step 21] The microcomputer PRS communicates with the lens-side microcomputer LPRS to set the zoom lens assembly L to its maximum focal length suitable for close-up photography. This is because many types of zoom lenses are designed to produce their maximum magnifications at their maximum focal lengths. After that, the process proceeds to Step 19, as in the case where the portrait photography AE mode is selected.

If the landscape photography AE mode is selected, the process proceeds from Step 16 to Step 22.

[Step 22] The microcomputer PRS communicates with the lens-side microcomputer LPRS to set the zoom lens assembly L to a focal length of 35 mm which is suitable for landscape photography. However, if 35 mm is not contained in the range of focal lengths of the attached zoom lens assembly L, the microcomputer PRS instructs the lens-side microcomputer LPRS to select a focal length closest to 35 mm from the range and set the zoom lens assembly L to the selected focal length. After that, the process proceeds to Step 19, as in the case where the portrait photography AE mode is selected.

In the above-described manner, the setting of the focal length of the zoom lens assembly L according to a desired one of the image select modes is completed. Then, the process proceeds to Step 23. If the position of the selector dial MODESEL is "P", the setting of the focal length of the zoom lens assembly L is not performed and the process jumps from Step 12 to Step 23.

[Step 23] It is checked whether the first stroke switch SW1 of the release button is on. If the first stroke switch SW1 is on, the process proceeds to Step 24.

[Step 24] A focus detecting operation is performed.

Figure 13A:
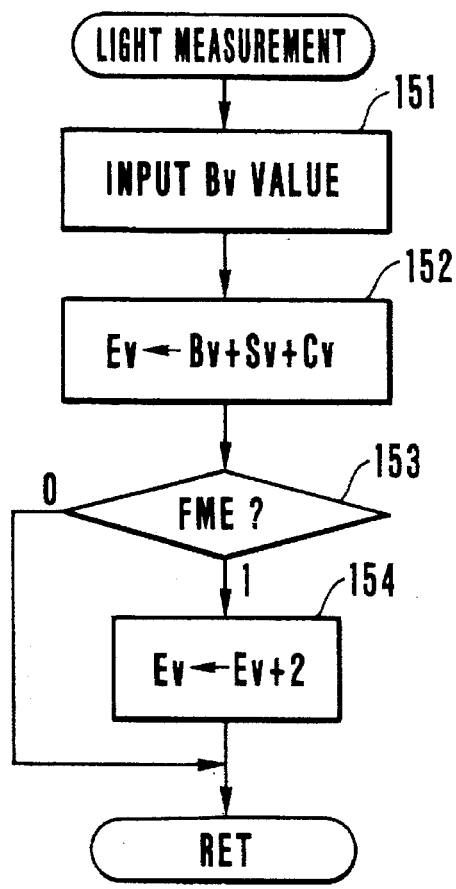
FIGS. 13(a) and 13(b) are flowcharts showing a light measuring operating and a focus detecting operation, respectively.
Figure 13B:
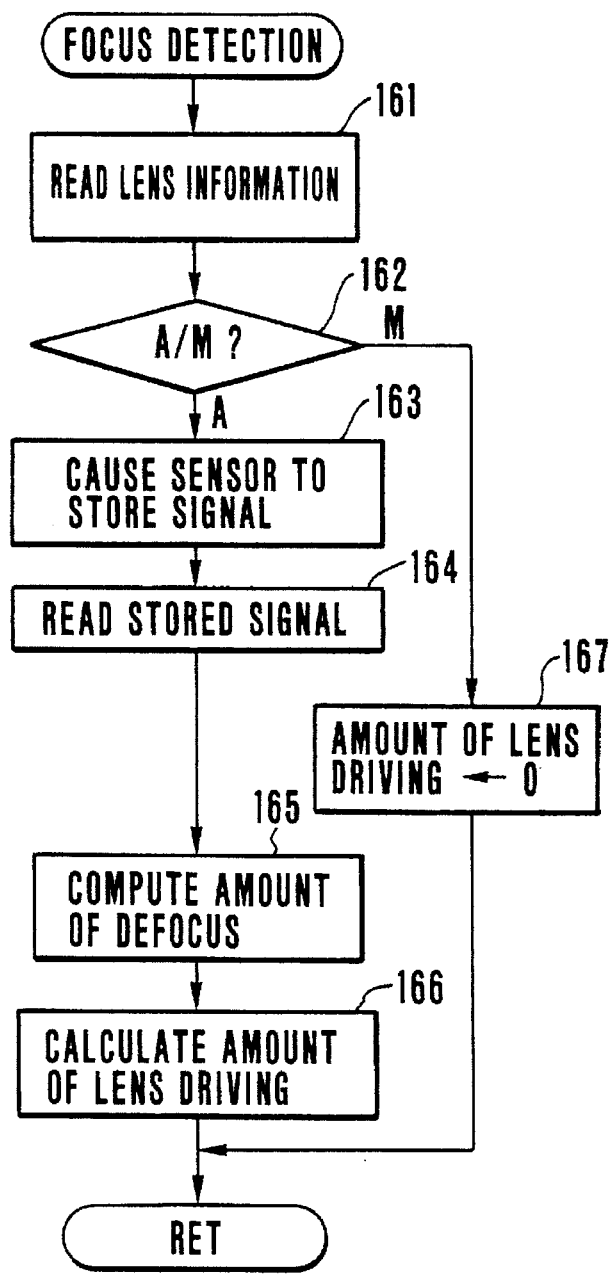

The focus detecting operation will be described below with reference to the subroutine shown in FIG. 13(b).

[Step 161] The microcomputer PRS communicates with the lens-side microcomputer LPRS to obtain the information required for focus detection, such as optical data on the zoom lens assembly L. Although the information required for focus detection, such as optical data on the zoom lens assembly L, has already been read in Step 7 described above, the same information is again read since a condition may have been varied by a zooming operation performed subsequently to Step 7.

[Step 162] A check is made as to the state of the autofocus/manual-focus selecting switch SWAM which is contained in the information read from the zoom lens assembly L, such as the optical data on the zoom lens assembly L. If the autofocus/manual-focus selecting switch SWAM is set to its autofocus side, the process proceeds to Step 163.

[Step 163] The microcomputer PRS communicates with the sensor controller SDR to cause the focus detecting sensor SNS to store a signal.

[Step 164] The microcomputer PRS communicates with the sensor controller SDR to perform reading the signal stored in the focus detecting sensor SNS.

[Step 165] The microcomputer PRS computes the amount of deviation of focus (the amount of defocus) on the basis of the signal read from the focus detecting sensor SNS.

[Step 166] The microcomputer PRS converts the amount of defocus obtained in Step 165 into the amount of driving of the focusing lens.

If the autofocus/manual-focus selecting switch SWAM is set to its manual-focus side, the process proceeds from Step 162 to Step 167.

[Step 167] The amount of driving of the focusing lens is set to "0".

Figure 7:
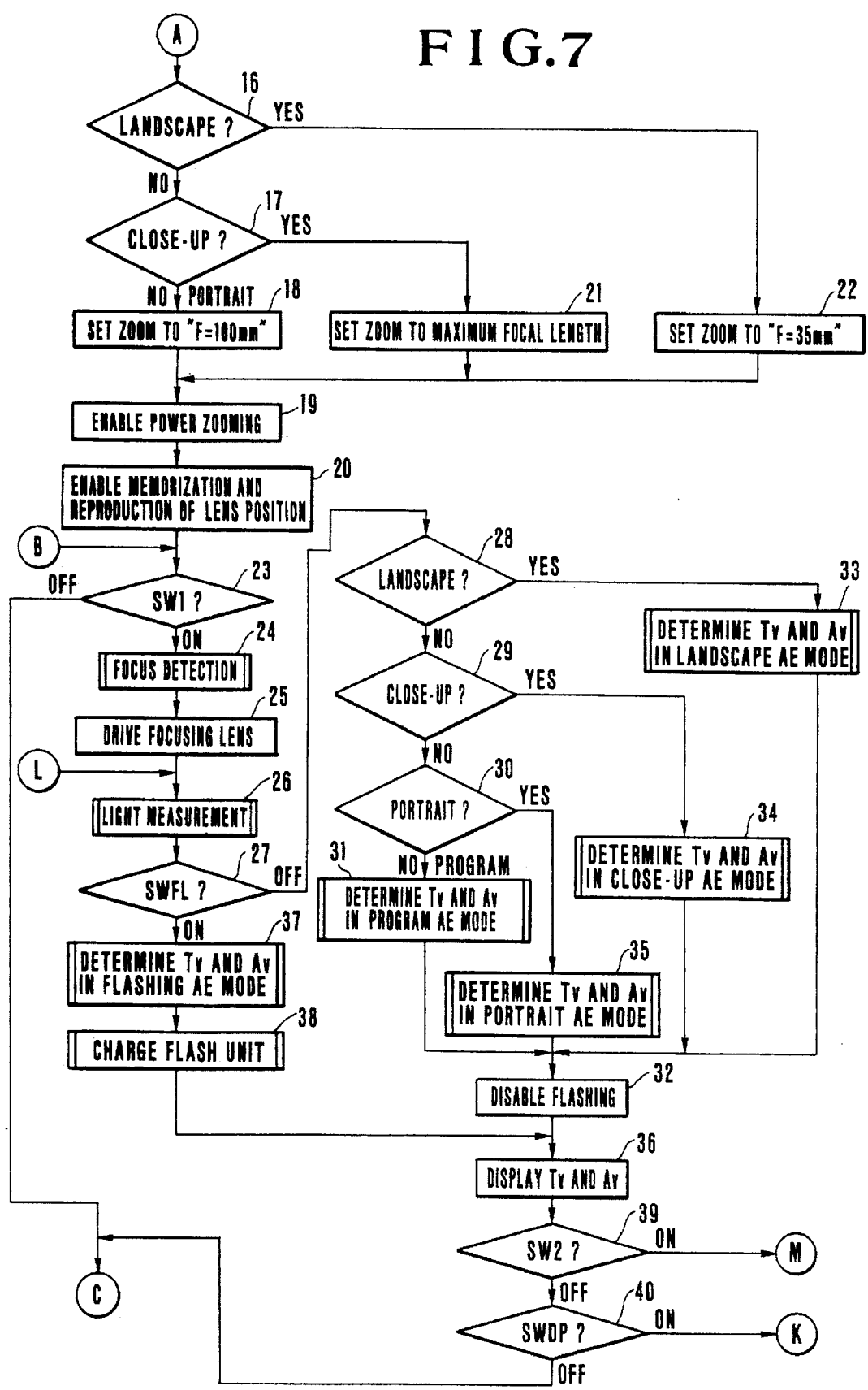
FIG. 7 is a flowchart showing a part which succeeds the operation shown in FIG. 6.

In the above-described manner, the focus detecting operation is completed, and the program returns to the main routine, i.e., Step 25 of FIG. 7.

[Step 25] The microcomputer PRS communicates with the lens-side microcomputer LPRS to send a driving instruction thereto so that the focusing lens can be driven in accordance with the amount of driving of the focusing lens obtained in the focus detecting subroutine. In accordance with the driving instruction, focusing is performed. If the autofocus/manual-focus selecting switch SWAM is set to the manual-focus side, since the amount of driving of the focusing lens has been set to "0" in Step 167 described above, no driving of the focusing lens is performed.

[Step 26] A light measuring operation is performed.

The light measuring operation will be described below with reference to the subroutine shown in FIG. 13(a).

[Step 151] The microcomputer PRS receives an output from the light measuring sensor NSPC and sets the received output as a Bv value which is absolute luminance information.

[Step 152] An Sv value indicative of film speed information which is set by film speed information setting means (not shown) and a Cv value indicative of exposure compensation value information are added to the Bv value obtained in Step 151, thereby providing a light measurement value (an Ev value).

[Step 153] It is checked whether the zoom multiple exposure mode setting flag FME to be described later is set. In the case of the normal state in which the zoom multiple exposure mode setting flag FME is not set, the process returns from this subroutine. If the zoom multiple exposure mode setting flag FME is set, the process proceeds to Step 154.

[Step 154] If multiple exposure is performed under normal exposure control, overexposure will occur. For this reason, the light measurement value obtained in Step 152 is shifted to reduce the aperture of a diaphragm by two steps. Accordingly, since the amount of exposure per multiple exposure cycle is controlled to be reduced during later AE control, it is possible to avoid overexposure.

In the above-described manner, the light measuring operation is completed, and the program returns to the main routine, i.e., Step 27 of FIG. 7.

[Step 27] A check is made as to the state of the flash detecting switch SWFL. If the flash unit is not ready and the flash detecting switch SWFL is off, the process proceeds to Step 28.

[Step 28] It is checked whether the position of the selector dial MODESEL is the landscape photography AE mode. If the landscape photography AE mode is not selected, the process proceeds to Step 29.

[Step 29] It is checked whether the position of the selector dial MODESEL is the close-up photography AE mode. If the close-up photography AE mode is not selected, the process proceeds to Step 30.

[Step 30] It is checked whether the position of the selector dial MODESEL is the portrait photography AE mode. If the portrait photography AE mode is not selected, it is determined that a normal program AE mode is selected, and the process proceeds to Step 31.

[Step 31] A shutter speed and an aperture value are determined on the basis of the light measurement value in accordance with a program chart specified for the program AE mode.

[Step 32] Since it is confirmed in Step 27 that the flash detecting switch SWFL is off, the microcomputer PRS communicates with the flash controller FLC to disable the flash unit from flashing.

If the position of the selector dial MODESEL is the landscape photography AE mode, the process jumps from Step 28 to Step 33.

[Step 33] A shutter speed and an aperture value are determined on the basis of the light measurement value in accordance with a program chart specified for the landscape photography AE mode. After that, the process proceeds to Step 32 as in the case of the program AE mode.

If the position of the selector dial MODESEL is the close-up photography AE mode, the process jumps from Step 29 to Step 34.

[Step 34] A shutter speed and an aperture value are determined on the basis of the light measurement value in accordance with a program chart specified for the close-up photography AE mode. After that, the process proceeds to Step 32 as in the case of the program AE mode.

If the position of the selector dial MODESEL is the portrait photography AE mode, the process jumps from Step 30 to Step 35.

[Step 35] A shutter speed and an aperture value are determined on the basis of the light measurement value in accordance with a program chart specified for the portrait photography AE mode. After that, the process proceeds to Step 32 as in the case of the program AE mode.

In each of the above-described AE modes, shutter speeds and aperture values are determined in the following manner so that the user can easily take a photograph which matches the image of each of the AE modes. For example, during the landscape photography AE mode, the diaphragm is controlled to reduce the aperture so that the depth-of-field can be made comparatively large, whereas during the portrait photography AE mode the diaphragm is controlled to open the aperture as fully as possible so that the extent of unsharpness of a background can be increased. During the close-up photography AE mode, the diaphragm is controlled so that a medium depth-of-field can be obtained. Since an art for achieving the above-described control are known, detailed description of the art is omitted herein.

[Step 36] Information indicative of the shutter speed and the aperture value which have been determined in accordance with a selected one of the aforesaid AE modes is communicated to the display driver DDR, and the information is displayed on the display DSP by the 7-segment group 7SEG-1 and the 7-segment group 7SEG-2. FIG. 2(c) shows a visual-display example which is provided when the shutter speed and the aperture value are determined as "1/250 second" and "F8.0", respectively.

If it is determined in Step 27 described above that the flash detecting switch SWFL is on, the process does not proceed to any of the above-described AE modes and control according to a flash AE mode is provided. Accordingly, the process proceeds from step 27 to step 36 via steps 37 and 38 as will be described below.

[Step 37] A shutter speed and an aperture value are determined on the basis of the light measurement value in accordance with a program chart designed for the flash AE mode. As a matter of course, the shutter speed is selected from among shutter speeds with which the flash unit can synchronize.

[Step 38] The microcomputer PRS communicates with the flash controller FLC to make preparations for flashing, such as charging of a main capacitor of the flash unit, thereby enabling the flash unit to flash. Then, the process proceeds to Step 36 as described above.

When the above-described operation of Step 36 is performed, the following step 39 is executed.

[Step 39] It is checked whether the second stroke switch SW2 of the release button is on. If the second stroke switch SW2 of the release button is off, the process proceeds to Step 40.

[Step 40] It is checked whether the depth display switch SWDP is on. If the depth display switch SWDP is off, the process proceeds to Step 41 of FIG. 6. Also, if it is determined in Step 23 of FIG. 7 that the first stroke switch SW1 of the release button is off, the process jumps to Step 41 of FIG. 6.

[Step 41] It is checked whether the exposure compensation switch SWCP is on. If the exposure compensation switch SWCP is on, the process proceeds to Step 42.

[Step 42] The microcomputer PRS communicates with the display driver DDR to receive an information input through the electronic dial DL. The information input through the electronic dial DL is indicative of an up/down value based on a criterion of "0" and based on the output signal of the electronic dial DL for generating two-phase pulses which are 90 degrees out of phase with each other, in response to a rotation of the electronic dial DL in accordance with the direction of the rotation of the electronic dial DL.

[Step 43] The exposure compensation value is changed in accordance with the information inputted through the electronic dial DL.

After that, the program returns to Step 2 and repeats the above-described steps. During these steps, the exposure compensation value changed in Step 11 is displayed, a light measurement computation based on the exposure compensation value changed in Step 26 is performed, and the resultant shutter speed and aperture value are displayed in Step 36. FIG. 2(d) shows a visual-display example which is provided when the changed exposure compensation value is −1 step.

If it is determined in Step 41 that the exposure compensation switch SWCP is off, the process proceeds to Step 44.

[Step 44] A check is made as to the state of the first stroke switch SW1 of the release button. If the first stroke switch SW1 of the release button is on, the process returns to Step 23 of FIG. 7 and repeats the above-described steps. If the first stroke switch SW1 of the release button is off, the process returns to Step 45.

[Step 45] A check is made as to the state of a zoom multiple exposure mode setting switch SWME. If the zoom multiple exposure mode setting switch SWME is off, the process returns to Step 2 and repeats the above-described steps. If the zoom multiple exposure mode setting switch SWME is on, the process proceeds to Step 102 of FIG. 10, as will be described later.

The manual exposure mode will be described below.

Figure 6:
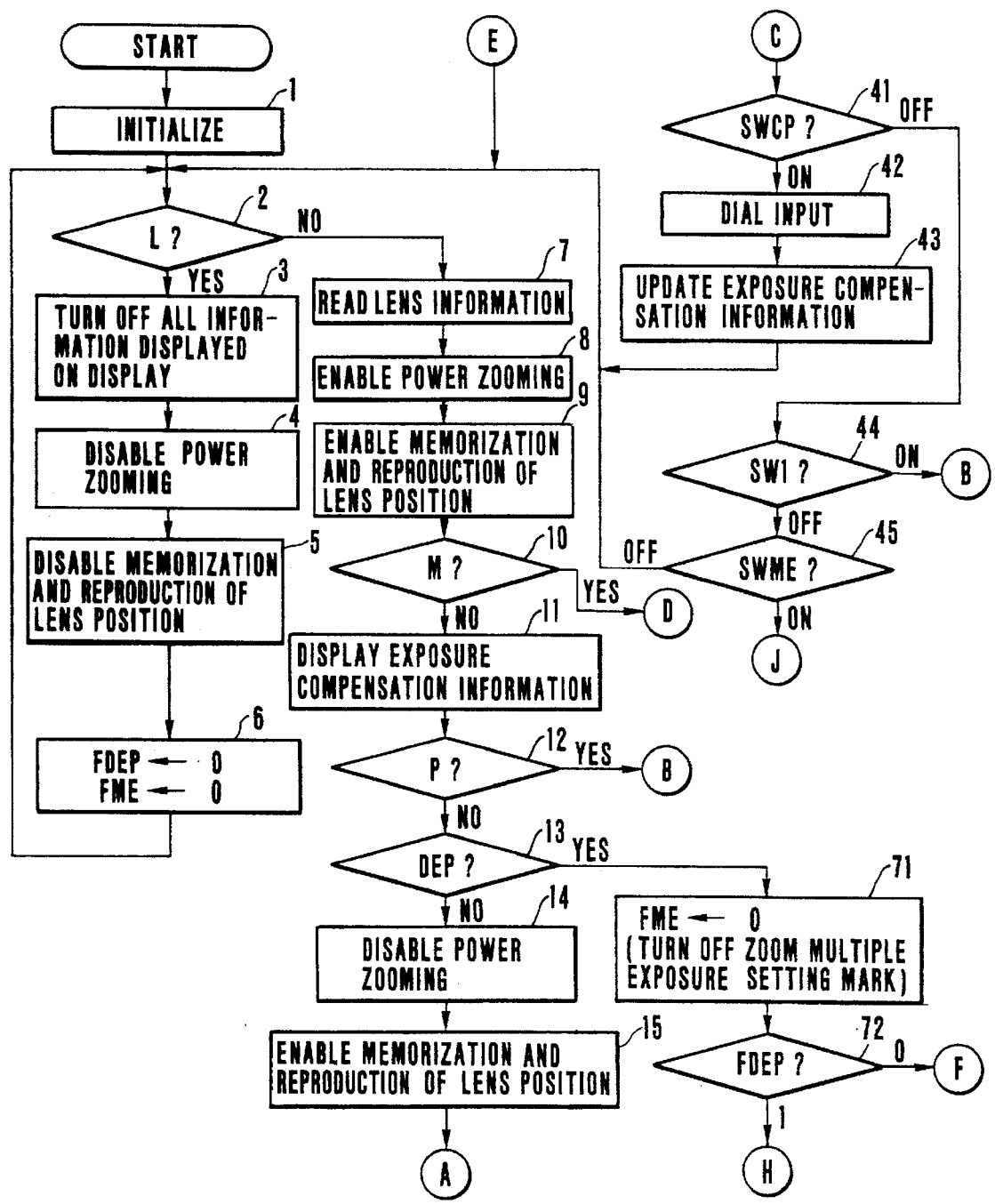
FIG. 6 is a flowchart showing a part of the operation performed on the camera-body side shown in FIG. 1.
Figure 8:
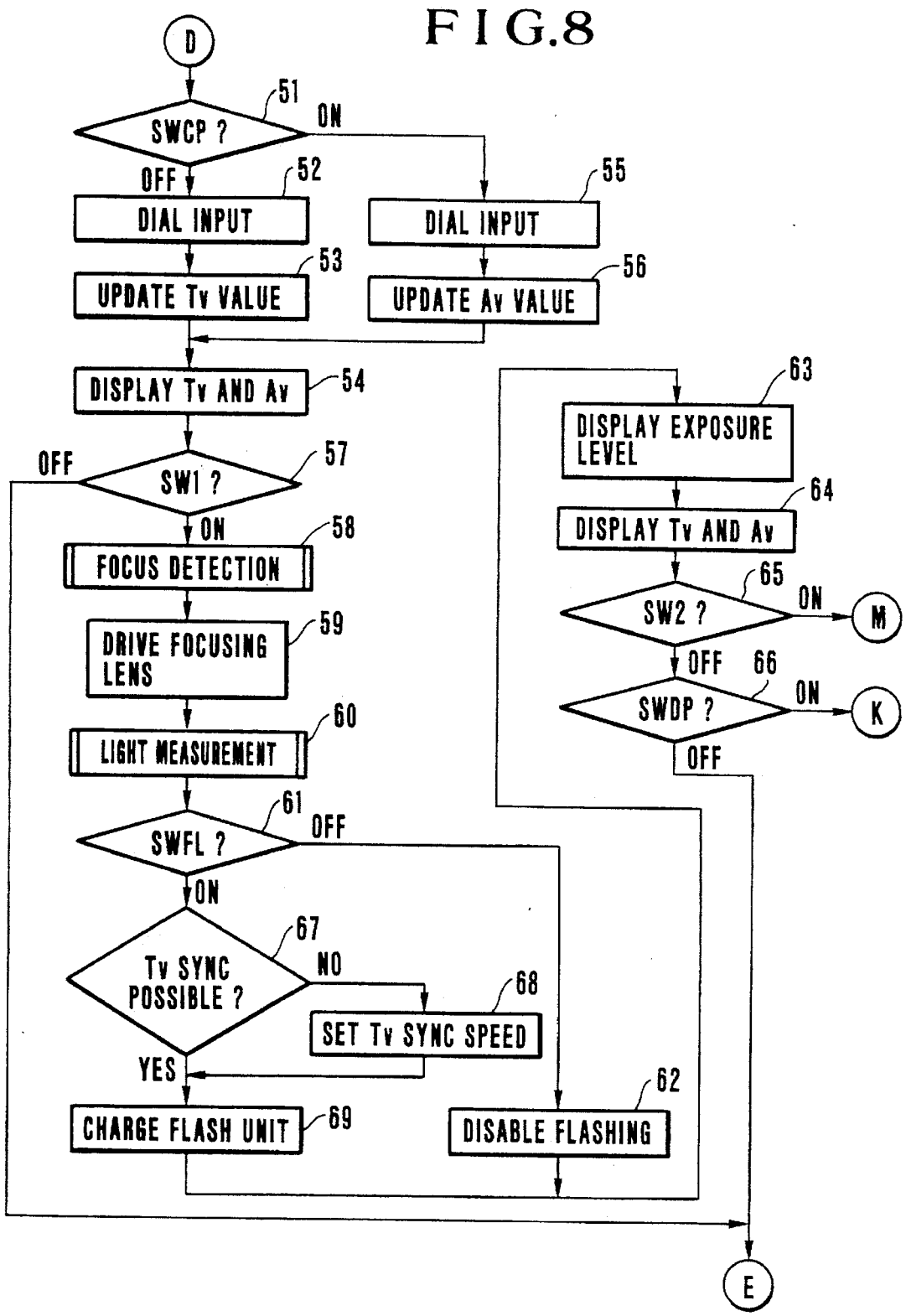
FIG. 8 is a flowchart showing a part which succeeds the operation shown in FIG. 7.

If the position of the selector dial MODESEL is "M", the process proceeds from Step 10 of FIG. 6 to Step 51 of FIG. 8.

[Step 51] It is checked whether the exposure compensation switch SWCP is on. Incidentally, the exposure compensation switch SWCP functions as an aperture value changing switch during the manual exposure mode. If the exposure compensation switch SWCP is off, the process proceeds to Step 52.

[Step 52] As in the case of Step 42, the microcomputer PRS communicates with the display driver DDR to receive an information input from the electronic dial DL.

[Step 53] The shutter speed value is changed in accordance with the information inputted from the electronic dial DL.

[Step 54] The shutter speed value and the aperture value which have been changed through Steps 52 and 53 are communicated to the display driver DDR and are respectively displayed on the display DSP by the 7-segment group 7SEG-1 and the 7-segment group 7SEG-2.

If it is determined in Step 51 that the exposure compensation switch SWCP is on, the process proceeds to Step 55.

[Step 55] As in the case of Step 52, the microcomputer PRS communicates with the display driver DDR to receive an information input from the electronic dial DL.

[Step 56] The aperture value is changed in accordance with the information inputted from the electronic dial DL.

After that, the process proceeds to Step 54, in which the shutter speed value and the aperture value which have been changed are communicated to the display driver DDR and are respectively displayed on the display DSP by 7-segment group 7SEG-1 and the 7-segment group 7SEG-2.

[Step 57] A check is made as to the state of the first stroke switch SW1 of the release button. If the first stroke switch SW1 is on, the process proceeds to Step 58.

[Step 58] A focus detecting operation is performed. The operation performed in Step 58 is similar to that described in connection with Step 24.

[Step 59] The microcomputer PRS communicates a drive instruction to the lens-side microcomputer LPRS so that the focusing lens is driven in accordance with the result of the previously-described focus detection. Thus, focusing is effected.

[Step 60] Light measurement is performed. The operation performed in Step 60 is similar to that described in connection with Step 26.

[Step 61] A check is made as to the state of the flash detecting switch SWFL. If the flash unit is not ready and the flash detecting switch SWFL is off, the process proceeds to Step 62.

[Step 62] The microcomputer PRS communicates with the flash controller FLC to disable the flash unit from flashing.

[Step 63] The result of the light measurement performed in Step 60 is compared with the set shutter speed value and the set aperture value to obtain a deviation, and the deviation is communicated to the display driver DDR, so that the deviation is displayed on the display DSP by the segment group METER SEG.

[Step 64] The shutter speed value and the aperture value are communicated to the display driver DDR and are respectively displayed on the display DSP by the 7-segment group 7SEG-1 and the 7-segment group 7SEG-2. Although this step may seem meaningless since the same operation as Step 54 is repeated, if it is determined in Step 61 that the flash detecting switch SWFL is on, Step 64 becomes meaningful, as will be described later.

[Step 65] It is checked whether the second stroke switch SW2 of the release button is on. If the second stroke switch SW2 of the release button is off, the process proceeds to Step 66.

[Step 66] It is checked whether the depth display switch SWDP is on. If the depth display switch SWDP is off, the process returns to Step 2 of FIG. 6 and repeats the flow described above.

Incidentally, if it is determined in Step 57 of FIG. 8 that the first stroke switch SW1 of the release button is off, the process returns to Step 2 of FIG. 6.

If it is it is determined in Step 61 that the flash detecting switch SWFL is on, the process proceeds to Step 67.

[Step 67] It is checked whether the shutter speed value which has presently been set is a shutter speed with which the flash unit can synchronize. In the case of a shutter speed with which the flash unit can synchronize, the process proceeds to Step 69. Otherwise, the process passes through Step 68 which is described below.

[Step 68] Since the flash unit cannot synchronize with the shutter speed value which has presently been set, the shutter speed value is changed to a shutter speed with which the flash unit can synchronize.

[Step 69] The microcomputer PRS communicates with the flash controller FLC to make preparations for flashing, such as charging of the main capacitor of the flash unit, thereby enabling the flash unit to flash. Then, the process proceeds to Step 63, as in the case where the flash detecting switch SWFL is off. If the process passes through Step 68 and the shutter speed value is changed to the shutter speed with which the flash unit can synchronize, this shutter speed is displayed in Step 64.

The manual exposure mode is as described above. In the following description, reference is made to the depth priority AE mode.

The operation of the depth priority AE mode will be described in brief below. First, when the first stroke switch SW1 of the release button is turned on with the camera aimed at a first subject, focus detection as to the first subject is performed. Then, when the first stroke switch SW1 of the release button is turned on with the camera aimed at a second subject, focus detection as to the second subject is performed. Finally, if the user determines a composition of the entire scene which contains the first and second subjects and performs a release operation, the camera selects an aperture value corresponding to a depth-of-field within which the camera can be focused onto both of the first and second subjects at the same time, and effects photography according to the selected aperture value.

If the selector dial MODESEL is set to the position "DEP", the depth priority AE mode is selected. If it is detected in Step 13 of FIG. 6 that the depth priority AE mode has been selected, the process proceeds to Step 71.

[Step 71] Since it is not proper to perform zoom multiple exposure photography during the depth priority AE mode, if the process proceeds to this step with the zoom multiple exposure mode being set, it is necessary to disable the zoom multiple exposure photography. For this reason, the zoom multiple exposure mode setting flag FME is cleared and the zoom multiple exposure setting mark is turned off on the display DSP. The manner of setting, etc. of the zoom multiple exposure mode will be described later.

[Step 72] It is checked whether the depth priority completion flag FDEP is set. Initially, since the depth priority completion flag FDEP remains reset in Step 1 or 6, the process proceeds to Step 73 of FIG. 9.

[Step 73] A check is made as to the state of the flash detecting switch SWFL. If the flash unit is not ready and the flash detecting switch SWFL is off, the process proceeds to Step 74. Incidentally, if the flash detecting switch SWFL is on, the process proceeds to Step 23 of FIG. 7 to transfer control from the depth priority AE mode to the flash AE mode, as in the case of the program AE mode.

[Step 74] The microcomputer PRS communicates with the lens-side microcomputer LPRS to check the state of the autofocus/manual-focus selecting switch SWAM of the zoom lens assembly L. If the autofocus/manual-focus selecting switch SWAM is set to its autofocus side, the process proceeds to Step 75. If the autofocus/manual-focus selecting switch SWAM is set to its manual-focus side, the depth priority AE mode is not selected and the process proceeds to Step 23 of FIG. 7 described previously to perform control based on the program AE mode.

[Step 75] It is checked whether the first stroke switch SW1 of the release button is on. If the first stroke switch SW1 of the release button is on, the process proceeds to Step 76. If the first stroke switch SW1 of the release button is off, the process proceeds to Step 41 of FIG. 6 described previously.

[Step 76] A focus detecting operation is performed. The operation performed in this step is identical to that described previously in connection with Step 24.

[Step 77] The microcomputer PRS communicates a drive instruction to the lens-side microcomputer LPRS so that the focusing lens is driven to move up to an in-focus position in accordance with the result of the focus detecting operation. Thus, a focusing operation relative to a first point in the depth priority AE mode is effected.

[Step 78] A visual display is provided which indicates that the focusing operation relative to the first point in the depth priority AE mode has been completed. The microcomputer PRS communicates with the display driver DDR to display "D(d)EP 1" on the display DSP by the 7-segment groups 7SEG-1 and 7SEG-2.

[Step 79] The microcomputer PRS communicates with the lens-side microcomputer LPRS to read out the current position of the focusing lens, i.e., the information of an encoder ENCL.

[Step 80] The microcomputer PRS communicates with the display driver DDR to turn off the exposure compensation information which has been displayed on the display DSP by the segment group METER SEG since the process passed through Step 11 of FIG. 6.

Figure 3A:
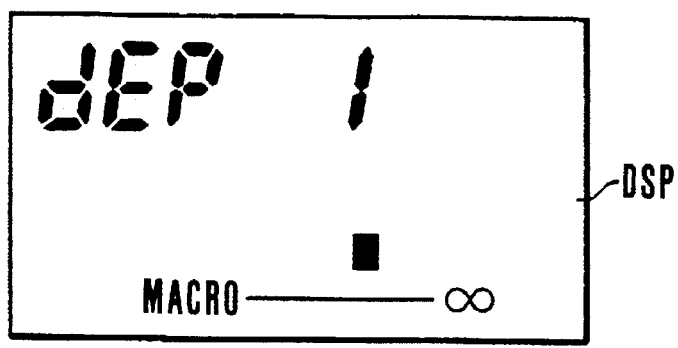
FIGS. 3(a) to 3(e) are views showing visual-display examples displayed on the display shown in FIG. 1.

[Step 81] The microcomputer PRS communicates the current position of the focusing lens, i.e., the information of the encoder ENCL which has been read in Step 79, to the display driver DDR, thereby causing the segment group METER SEG of the display DSP to display the information. For example, if the current position of the focusing lens is somewhat closer to an infinity end of the zoom lens assembly L from the middle between the infinity end and a closest-distance end, the state of visual display provided on the display DSP at this time is as shown in FIG. 3(a).

[Step 82] It is checked whether the first stroke switch SW1 of the release button is on. If the first stroke switch SW1 of the release button is on, the process waits for the first stroke switch SW1 to be once turned off. If it is detected that the first stroke switch SW1 is turned off, the process proceeds to Step 83.

[Step 83] It is again checked whether the first stroke switch SW1 of the release button is on. If the first stroke switch SW1 of the release button is off, the process waits for the first stroke switch SW1 to be once turned on. If it is detected that the first stroke switch SW1 is turned on, the process proceeds to Step 84.

[Step 84] A focus detecting operation is performed. The operation performed in this step is identical to that described previously in connection with Step 24.

[Step 85] The microcomputer PRS communicates a drive instruction to the lens-side microcomputer LPRS so that the focusing lens is driven to move up to an in-focus position in accordance with the result of the focus detecting operation. Thus, a focusing operation relative to a second point in the depth priority AE mode is effected.

[Step 86] A visual display is provided which indicates that the focusing operation relative to the second point in the depth priority AE mode has been completed. The microcomputer PRS communicates with the display driver DDR to display "DEP 2" on the display DSP by the 7-segment groups 7SEG-1 and 7SEG-2.

[Step 87] The microcomputer PRS communicates with the lens-side microcomputer LPRS to read out the current position of the focusing lens, i.e., the information of an encoder ENCL.

Figure 3B:
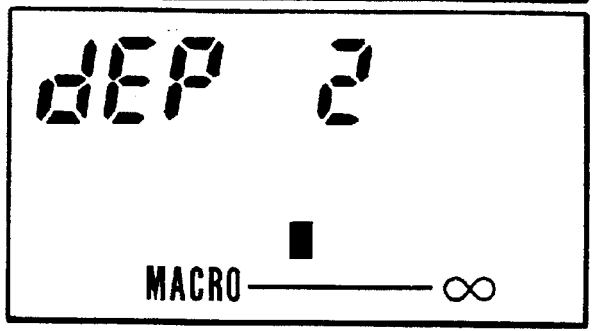

[Step 88] The microcomputer PRS communicates the current position of the focusing lens, i.e., the information of the encoder ENCL which has been read in Step 87, to the display driver DDR, thereby causing the segment group METER SEG of the display DSP to display the information. For example, if the current position of the focusing lens is somewhat closer to the closest-distance end of the zoom lens assembly L from the middle between the infinity end and the closest-distance end, the state of visual display provided on the display DSP at this time is as shown in FIG. 3(b).

[Step 89] It is checked whether the first stroke switch SW1 of the release button is on. If the first stroke switch SW1 of the release button is on, the process waits for the first stroke switch SW1 to be once turned off. If it is detected that the first stroke switch SW1 is turned off, the process proceeds to Step 90.

[Step 90] It is again checked whether the first stroke switch SW1 of the release button is on. If the first stroke switch SW1 of the release button is off, the process waits for the first stroke switch SW1 to be once turned on. If it is detected that the first stroke switch SW1 is turned on, the process proceeds to Step 91.

[Step 91] The microcomputer PRS communicates a drive instruction to the lens-side microcomputer LPRS so that the focusing lens is driven to move toward the first point by ½ of the amount of defocus between the first point and the second point which has been obtained through the focus detecting operation in Step 84. The focusing lens is driven to move to the middle position between the first point and the second point, whereby the position of the focusing lens during photography in the depth priority AE mode is determined.

[Step 92] ½ of the amount of defocus between the first point and the second point which has been obtained through the focus detecting operation in Step 84 is divided by the diameter of an allowable circle of confusion, thereby calculating an aperture value which properly covers the depth-of-field ranging from the first point to the second point.

[Step 93] A light measuring operation is performed. The operation performed in Step 93 is identical to that described in connection with Step 26.

[Step 94] A shutter speed value Tv is obtained by subtracting the aperture value Av obtained in Step 92 from the light measurement value Ev obtained in Step 93.

[Step 95] The shutter speed value Tv obtained in Step 94 and the aperture value Av obtained in Step 92 are communicated to the display driver DDR and are respectively displayed on the display DSP by the 7-segment group 7SEG-1 and the 7-segment group 7SEG-2.

[Step 96] The depth priority completion flag FDEP is set. The process proceeds to Step 97 of FIG. 10.

[Step 97] It is checked whether the exposure compensation switch SWCP is on. If the exposure compensation switch SWCP is on, the process proceeds to Step 41 of FIG. 6 and the previously-described exposure compensation information changing routine is executed. If the exposure compensation switch SWCP is off, the process proceeds to Step 98.

Figure 3C:
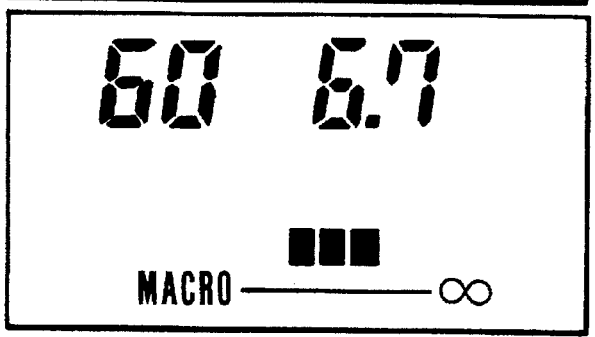
Figure 9:
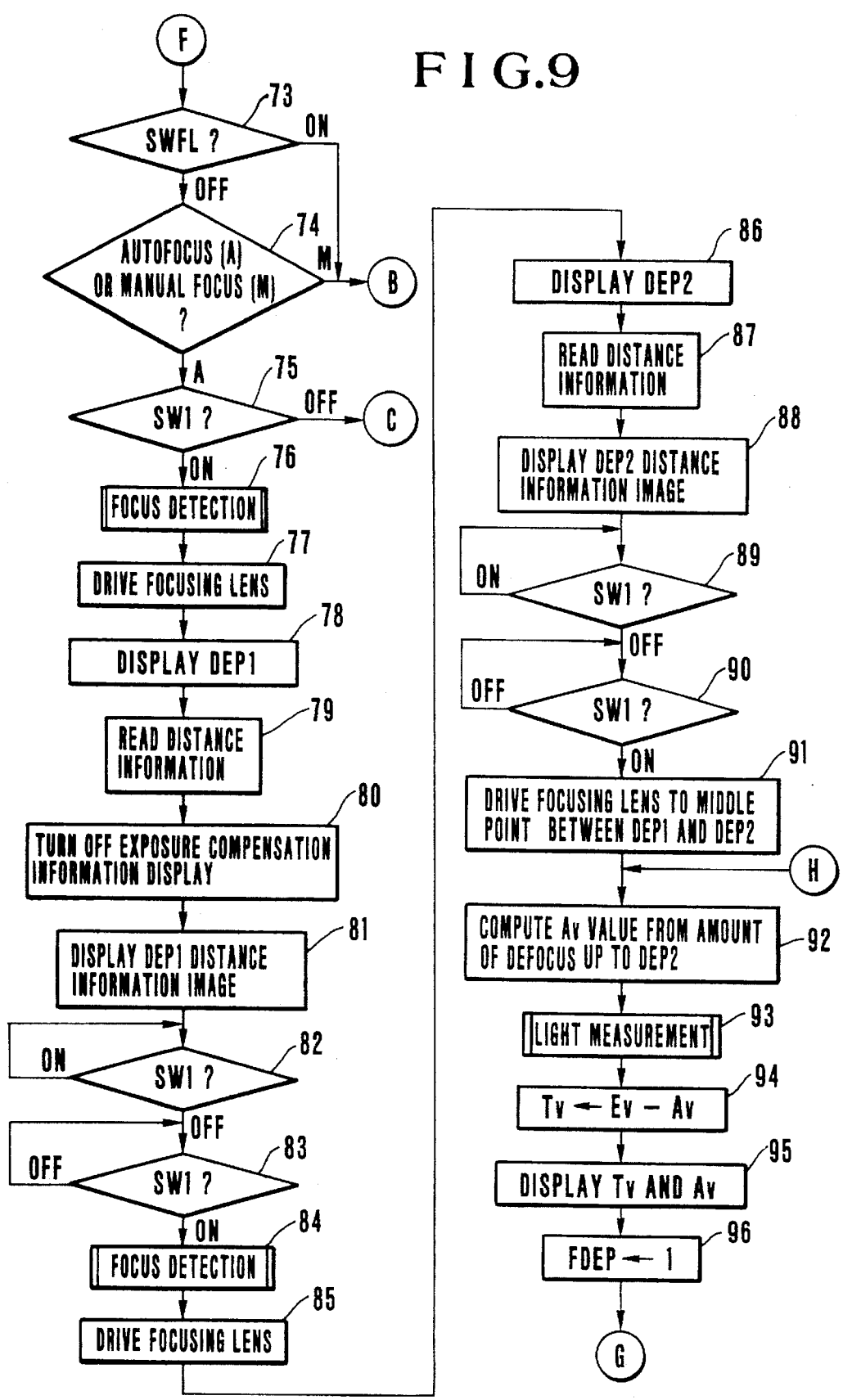
FIG. 9 is a flowchart showing a part which succeeds the operation shown in FIG. 8.

[Step 98] The microcomputer PRS communicates with the display driver DDR to update the visual display provided by the segment group METER SEG of the display DSP, thereby displaying a position display, provided in Step 81 of FIG. 9, indicative of the position of the focusing lens at the first point, a position display, provided in Step 88 of FIG. 9, indicative of the position of the focusing lens at the second point and all the display segments positioned between both position displays. Thus, the state of visual display provided at this time is as shown in FIG. 3(c), whereby the shutter speed value and the aperture value as well as an image representative of the depth-of-field, which are the results of the above-described operations according to the depth priority AE mode, are displayed in easily recognizable form.

Figure 3D:
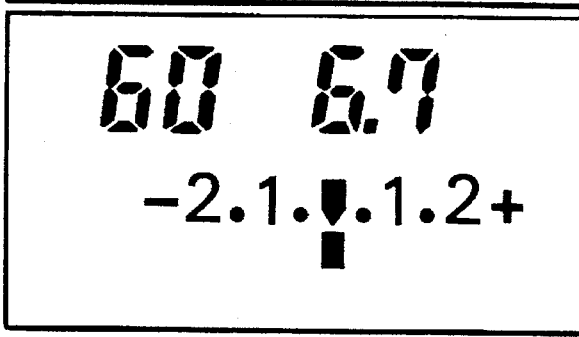

Incidentally, if it is determined in Step 97 that the exposure compensation switch SWCP is on and the process proceeds to Step 41 of FIG. 6 in which the previously-described exposure compensation information changing routine is executed, since the process passes through Step 11, the visual display of the segment group METER SEG of the display DSP is changed to a visual display of exposure compensation information such as that shown in FIG. 3(d). After that, the process proceeds to Step 13 and then passes through Step 71 and Step 72. Since it is determined in Step 72 that the depth priority completion flag FDEP has been set, the process proceeds to Step 92 of FIG. 9 and holds the resultant depth priority AE completion state.

Returning to FIG. 10, the shown flowchart is described below.

[Step 99] It is checked whether the second stroke switch SW2 of the release button is on. If the second stroke switch SW2 of the release button is off, the process proceeds to Step 100.

[Step 100] It is checked whether the first stroke switch SW1 of the release button is on. If the first stroke switch SW1 of the release button is off, the process proceeds to Step 101.

[Step 101] The depth priority completion flag FDEP is cleared to "0".

The program returns to FIG. 2 of FIG. 6, and repeats the above-described steps from the beginning. If it is determined in Step 100 that the first stroke switch SW1 of the release button is on, the program returns to Step 92 of FIG. 9 and the depth priority completion state is held.

The depth priority AE mode is as described above. Then, the setting of the zoom multiple exposure mode is described below.

Figure 10:
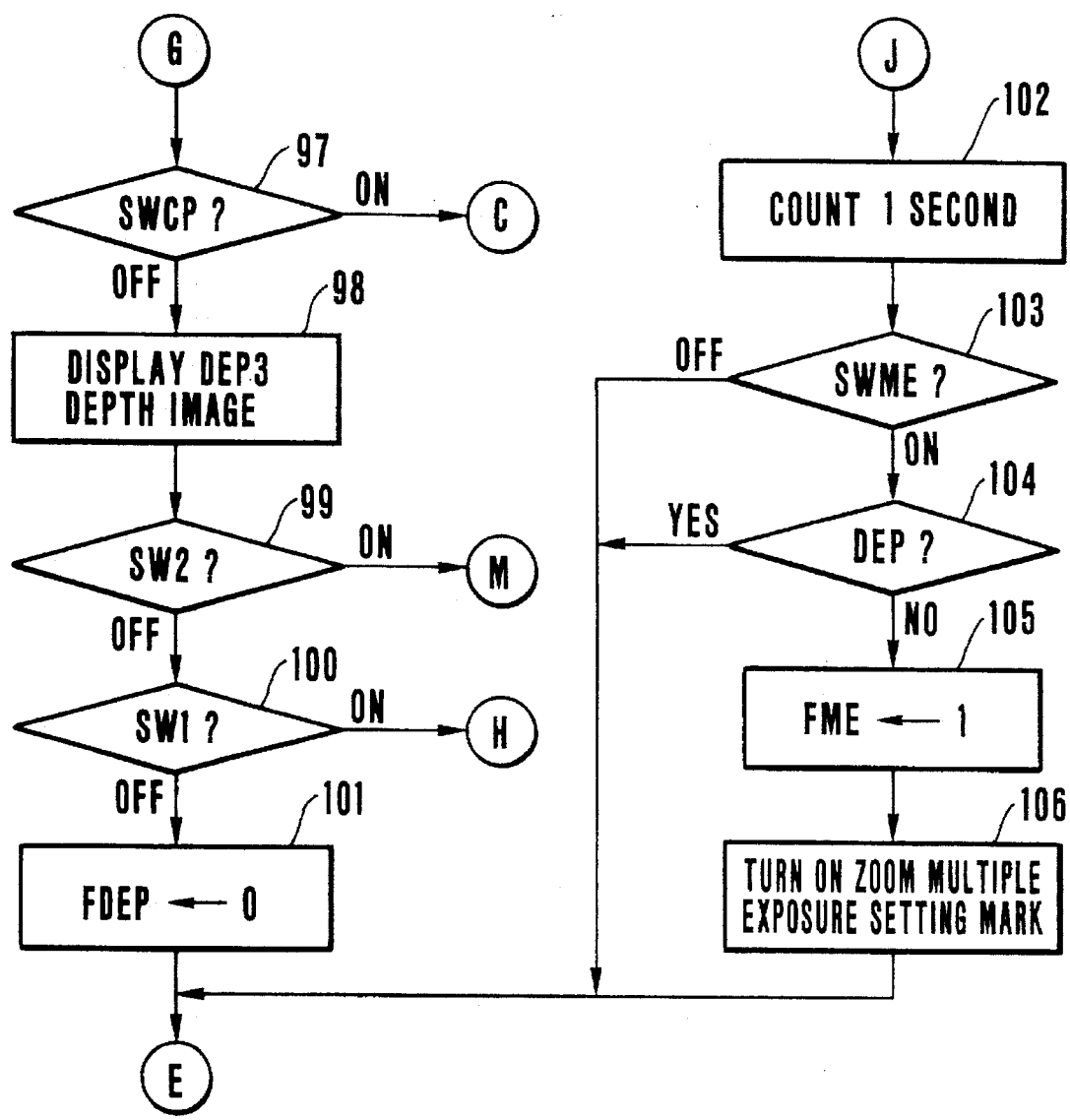
FIG. 10 is a flowchart showing a part which succeeds the operation shown in FIG. 9.

If it is detected in Step 45 of FIG. 6 described previously that the zoom multiple exposure mode setting switch SWME is on, the process proceeds to Step 102 of FIG. 10.

[Step 102] 1 second is counted.

[Step 103] It is checked whether the zoom multiple exposure mode setting switch SWME is on. In this step, to prevent the zoom multiple exposure mode setting switch SWME from being accidently pressed to set the zoom multiple exposure mode, it is confirmed whether the zoom multiple exposure mode setting switch SWME has been continuously on for 1 second. At this time, if the zoom multiple exposure mode setting switch SWME is off, the program does not set the zoom multiple exposure mode and returns to Step 2 of FIG. 6, and the above-described steps are repeated from the beginning. If zoom multiple exposure mode setting switch SWME is on, the process proceeds to Step 104.

[Step 104] It is checked whether the selector dial MODE-SEL is set to the position "DEP". Since it is not proper to perform zoom multiple exposure photography during the depth priority AE mode, if the process proceeds to this step with the depth priority AE mode being set, it is necessary to disable the zoom multiple exposure photography. For this reason, if the selector dial MODESEL is set to the position "DEP", the program returns to Step 2 of FIG. 6. Otherwise, the process proceeds to Step 105.

[Step 105] The zoom multiple exposure mode setting flag FME is set.

Figure 3E:
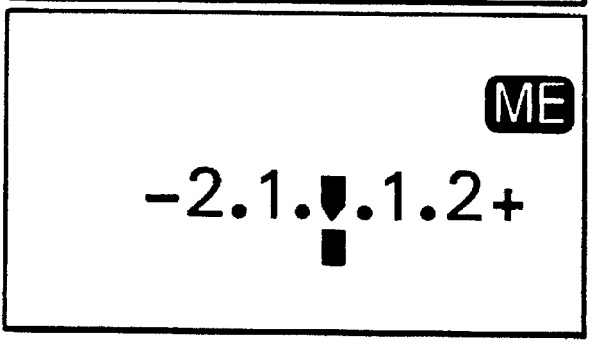

[Step 106] The microcomputer PRS communicates with the display driver DDR so that the zoom multiple exposure setting mark is displayed on the display DSP. At this time, a visual display is provided as shown in FIG. 3(e). The setting of the zoom multiple exposure mode is completed and the process returns to Step 2 of FIG. 6.

Operations performed when the depth display switch SWDP is turned on are described below.

Figure 11:
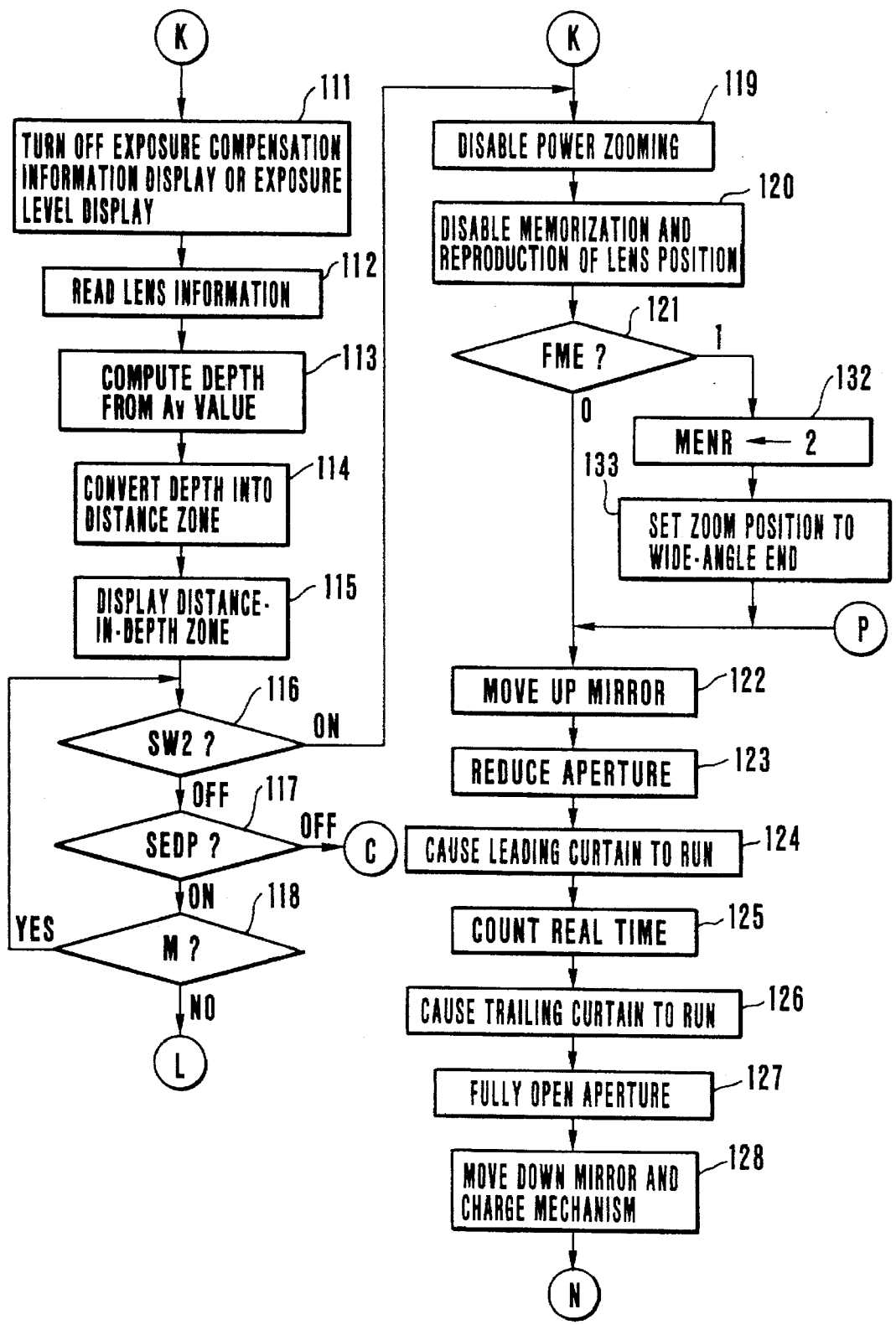
FIG. 11 is a flowchart showing a part which succeeds the operation shown in FIG. 10.

If it is determined that the depth display switch SWDP is on in Step 40 of FIG. 7 or Step 66 of FIG. 8, the process proceeds to Step 111 of FIG. 11.

[Step 111] The microcomputer PRS communicates with the display driver DDR to turn off an exposure-compensation visual display provided by the segment group METER SEG of the display DSP or an exposure-level visual display provided during the manual exposure mode.

[Step 112] The microcommuter PRS communicates with the lens-side microcomputer LPRS to read out the current position of the focusing lens, i.e., the information of the encoder ENCL, the information of the zoom encoder ENCZ and other information required to calculate the depth-of-field.

[Step 113] The current aperture value, which has been set or computed during any of the exposure modes before the process reaches this step, is multiplied by the diameter of an allowable circle of confusion, to thereby obtain the amount of defocus relative to one side which can be accepted as an in-focus point within the depth-of-field.

[Step 114] The amount of defocus relative to the one side which can be accepted as an in-focus point within the depth-of-field, which amount is obtained in Step 113, i.e., a depth width corresponding to the amount of defocus, is converted into a depth width which corresponds to a position to which the focusing lens is to be actually moved, by making reference to optical information on the zoom lens assembly L, i.e., a relational coefficient between the amount of defocus and the amount of movement of the focusing lens.

[Step 115] Information indicative of the depth width which corresponds to the position to which the focusing lens is to be actually moved, which position is obtained in Step 114, is communicated to the display driver DDR to cause the information to be displayed on the display DSP by the segment group METER SEG. The visual display provided at this time is as shown in FIG. 2(e).

[Step 116] It is checked whether the second stroke switch SW2 of the release button is on. If the second stroke switch SW2 of the release button is off, the process proceeds to Step 117.

[Step 117] It is checked whether the depth display switch SWDP continues to be on. If the depth display switch SWDP is on, the process proceeds to Step 118.

[Step 118] It is checked whether the selector dial MODE-SEL is set to the position "M". If the selector dial MODE-SEL is set to the position "M", the process returns to Step 116. If the selector dial MODESEL is set to a position other than "M", the process returns to Step 26 of FIG. 7 so that a light measurement computation for exposure control is performed. Incidentally, if it is determined in Step 117 that the depth display switch SWDP is off, the process returns to Step 41 of FIG. 6 to escape from a depth display state.

The following description refers to a case in which it is detected that the second stroke switch SW2 of the release button is on and the program enters a release sequence.

If it is detected that the second stroke switch SW2 of the release button is on in Step 39 of FIG. 7, Step 65 of FIG. 8, step 99 of FIG. 10 or Step 116 of FIG. 11, the process proceeds to Step 119 of FIG. 11.

[Step 119] The microcomputer PRS communicates with the lens-side microcomputer LPRS to disable the lens-side microcomputer LPRS from accepting any operating instruction from the telephoto-side zoom switch SWZT and the wide-angle-side zoom switch SWZW.

[Step 120] The microcomputer PRS communicates with the lens-side microcomputer LPRS to disable the lens-side microcomputer LPRS from accepting any operating instruction from the lens-position memory switch SWMM and the lens-position reproduction switch SWPL.

[Step 121] It is checked whether the zoom multiple exposure mode setting flag FME is set. In the case of a general photographic condition under which the zoom multiple exposure mode setting flag FME is not set, the process proceeds to Step 122.

[Step 122] The microcomputer PRS outputs the signals M2F and M2R to drive the motor MTR2, thereby executing a mirror-up operation.

[Step 123] The microcomputer PRS communicates a drive instruction to the lens-side microcomputer LPRS so that the aperture of the diaphragm is reduced in accordance with the current aperture value, which has been set or computed during any of the exposure modes before the process reaches this step.

[Step 124] The microcomputer PRS outputs a signal SMG1 to energize the transistor TR1, thereby causing the leading curtain of the shutter to run. Thus, an exposure cycle is started.

[Step 125] The microcomputer PRS counts real time in accordance with the current shutter speed, which has been set or computed during any of the exposure modes before the process reaches this step.

[Step 126] The microcomputer PRS outputs a signal SMG2 to energize the transistor TR2, thereby causing the trailing curtain of the shutter to run. Thus, the exposure cycle is ended.

[Step 127] The microcomputer PRS communicates a drive instruction to the lens-side microcomputer LPRS so that the aperture of the diaphragm is fully opened.

[Step 128] The microcomputer PRS outputs the signals M2F and M2R to drive the motor MTR2, thereby executing a mirror-down operation and a mechanism charging operation. Then, the process proceeds to Step 129 of FIG. 12.

[Step 129] It is checked whether the zoom multiple exposure mode setting flag FME is set. Since the current photographic condition is the general photographic condition under which the zoom multiple exposure mode setting flag FME is not set, the process proceeds to Step 130.

[Step 130] The depth priority completion flag FDEP is cleared to "0". This step is meaningless as long as no photography is performed in the depth priority AE mode. However, if photography is performed in the depth priority AE mode, it is impossible to input new depth priority information if the depth priority completion flag FDEP is not cleared to "0". For this reason, the depth priority completion flag FDEP is cleared in this step.

[Step 131] The microcomputer PRS outputs the signals M1F and M1R to drive the motor MTR1, thereby executing a film winding operation.

Thus, a general release sequence is ended, and the program returns to Step 2 of FIG. 6.

If it is detected in Step 121 described above that the zoom multiple exposure mode setting flag FME is set, the release sequence proceeds from Step 121 of FIG. 11 to Step 132.

[Step 132] "2" is set in a zoom multiple exposure number counting register MENR.

[Step 133] The microcomputer PRS communicates a drive instruction to the lens-side microcomputer LPRS so that a zooming motor is driven to set a zoom position to a wide-angle end.

Figure 12:
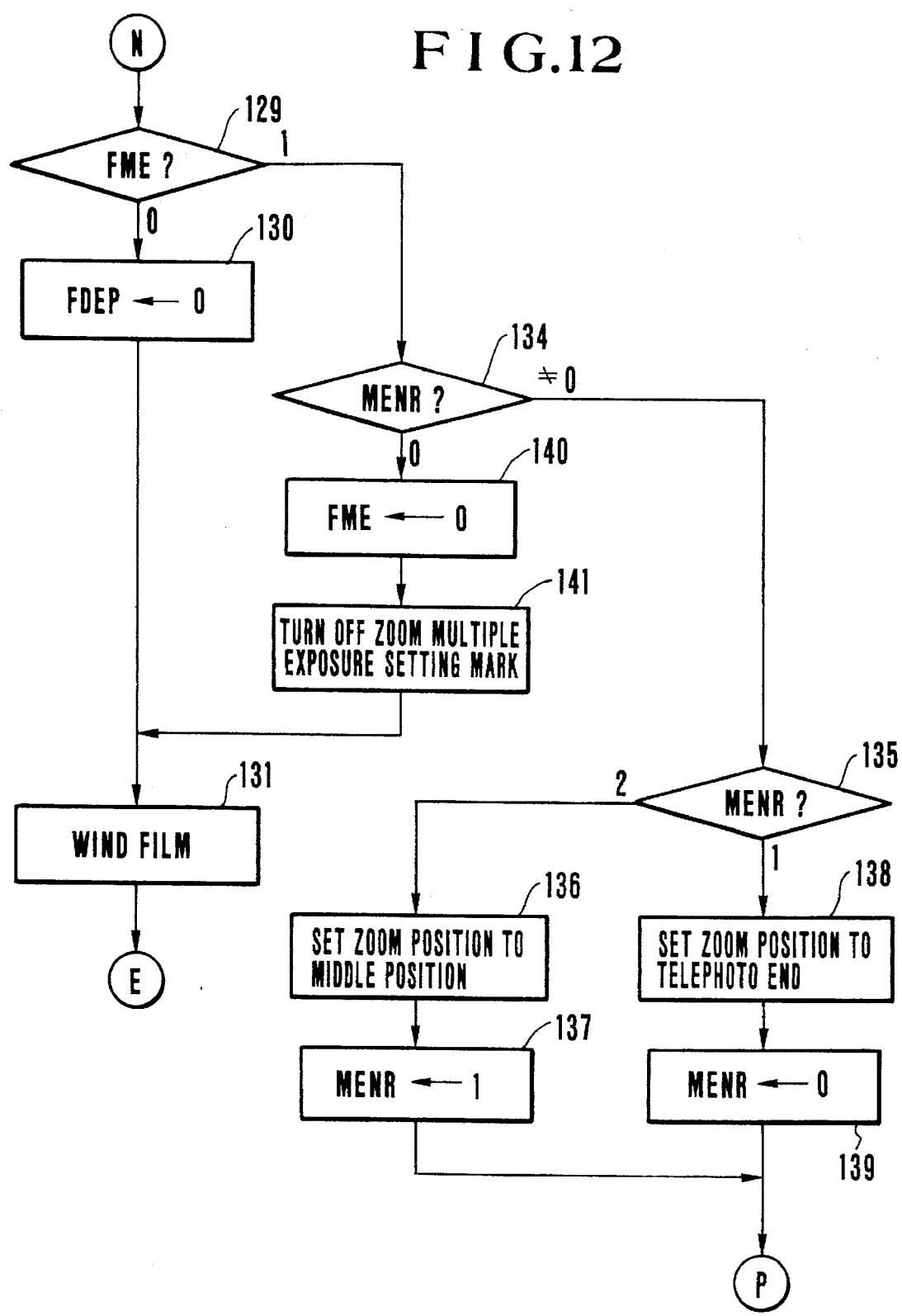
FIG. 12 is a flowchart showing a part which succeeds the operation shown in FIG. 11.

After that, similarly to the general release sequence, the process proceeds from Step 122 of FIG. 11 to Step 129 of FIG. 12, thereby executing a first exposure cycle with the zoom position set to the wide-angle end. Then, the process proceeds from Step 129 to Step 134.

[Step 134] It is checked whether the content of the zoom multiple exposure number counting register MENR is "0". Since "2" has been set in Step 132, the process proceeds to Step 135.

[Step 135] It is checked whether the content of the zoom multiple exposure number counting register MENR is "2" or "1". Since "2" has been set in Step 132, the process proceeds to Step 136.

[Step 136] The microcomputer PRS communicates a drive instruction to the lens-side microcomputer LPRS so that the zooming motor is driven to set the zoom position to the middle between the wide-angle end and a telephoto end.

[Step 137] The content of the zoom multiple exposure number counting register MENR is decremented to "1".

After that, the process returns to Step 122 of FIG. 11 and repeats the release sequence of up to Step 129 of FIG. 12. Thus, a second exposure cycle is performed with the zoom position set to the middle between the wide-angle end and the telephoto end. Then, the process again proceeds from Step 129 to Step 134.

[Step 134] It is checked whether the content of the zoom multiple exposure number counting register MENR is "0". Since "1" has been set in Step 137, the process proceeds to Step 135.

[Step 135] It is checked whether the content of the zoom multiple exposure number counting register MENR is "2" or "1". Since "1" has been set in Step 137, the process proceeds to Step 138.

[Step 138] The microcomputer PRS communicates a drive instruction to the lens-side microcomputer LPRS so that the zooming motor is driven to set the zoom position to the telephoto end.

[Step 139] The content of the zoom multiple exposure number counting register MENR is decremented to "0".

After that, the process returns to Step 122 of FIG. 11 and repeats the release sequence of up to Step 129 of FIG. 12. Thus, a third exposure cycle is performed with the zoom position set to the telephoto end. Then, the process again proceeds from Step 129 to Step 134.

[Step 134] It is checked whether the content of the zoom multiple exposure number counting register MENR is "0". Since "0" has been set in Step 139, the process proceeds to Step 140.

[Step 140] Since the zoom multiple exposure photography has been ended, the zoom multiple exposure mode setting flag FME is cleared to "0".

[Step 141] The microcomputer PRS communicates with the display driver DDR so that the zoom multiple exposure setting mark is turned off on the display DSP.

After that, the process proceeds to Step 131 where a film winding operation is performed, and all the operations of the zoom multiple exposure photography are completed.

The acceptance of an input from each lens-side operating member which has been disabled in Steps 119 and 120 of FIG. 11 is again enabled in Step 7 and 8 of FIG. 6 after the completion of the release routine.

The operation of the microcomputer PRS is as described above.

Figure 14:
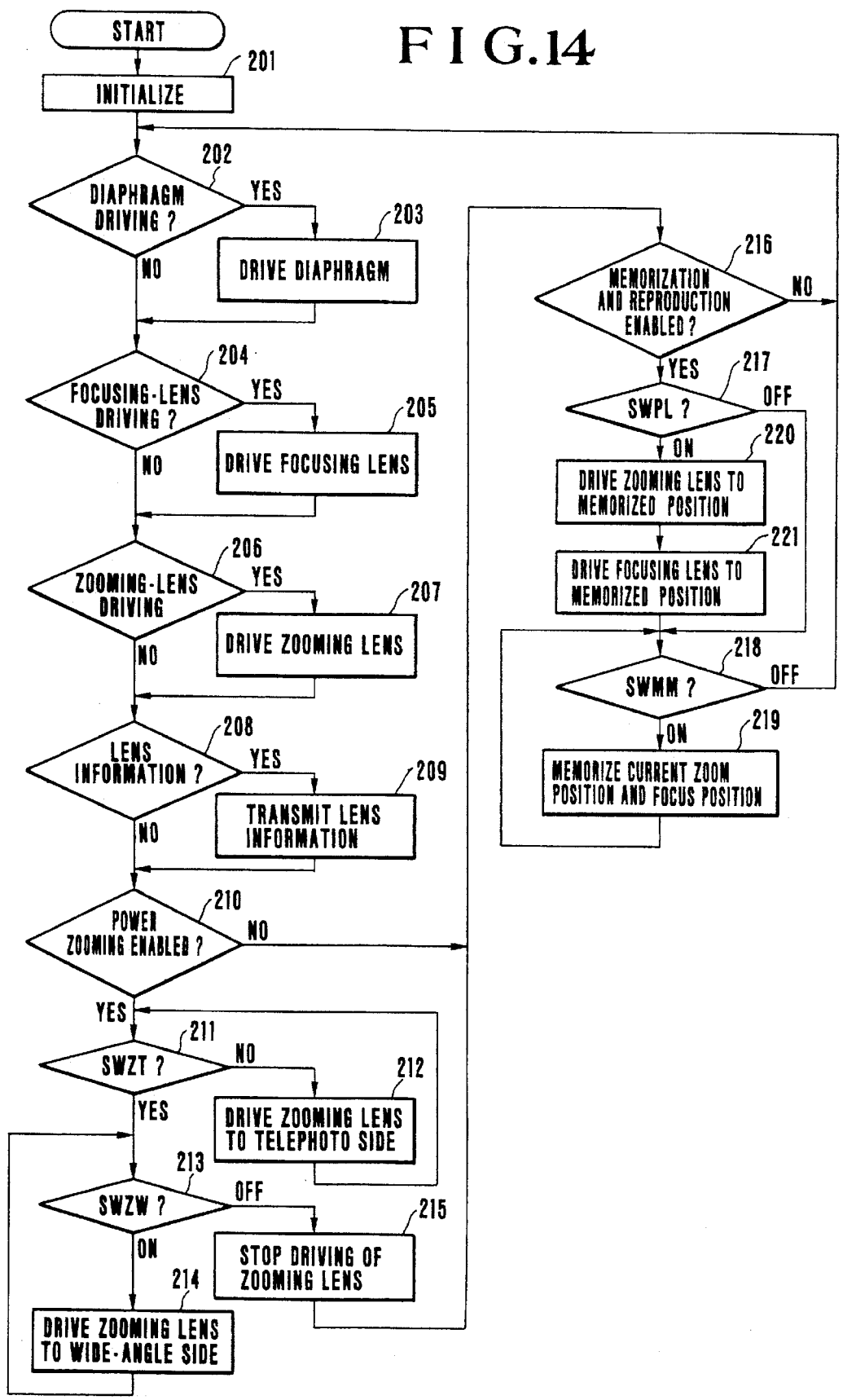
FIG. 14 is a flowchart showing the operation of the zoom lens assembly shown in FIG. 1.

Finally, the operation of the lens-side microcomputer LPRS is described below with reference to the flowchart of FIG. 14.

When the zoom lens assembly L is attached to the camera body C and electricity is supplied from the camera body C to the zoom lens assembly L, the lens-side microcomputer LPRS becomes operable and starts its operation with Step 201.

[Step 201] The lens-side microcomputer LPRS initializes the output of each of the ports, each flag on the memory, and the registers.

[Step 202] It is checked whether a diaphragm drive instruction has been sent from the microcomputer PRS. If the diaphragm drive instruction has been sent, the process proceeds to Step 203.

[Step 203] The lens-side microcomputer LPRS controls the diaphragm driving motor DMTR by the signal DMCT in accordance with the diaphragm drive instruction, thereby driving the diaphragm. Then, the process proceeds to Step 204. Incidentally, if it is determined in Step 202 that the diaphragm drive instruction has not been sent, the process proceeds to Step 204 without passing through Step 203.

[Step 204] It is checked whether a focusing-lens drive instruction has been sent from the microcomputer PRS. If the diaphragm drive instruction has been sent, the process proceeds to Step 205.

[Step 205] The lens-side microcomputer LPRS controls the focusing-lens driving motor LMTR by the signals LMF and LMR in accordance with the focusing-lens drive instruction, thereby driving the diaphragm. Then, the process proceeds to Step 206. Incidentally, if it is determined in Step 204 that the focusing-lens drive instruction has not been sent, the process proceeds to Step 206 without passing through Step 205.

[Step 206] It is checked whether a zooming-lens drive instruction has been sent from the microcomputer PRS. If the zooming-lens drive instruction has been sent, the process proceeds to Step 207.

[Step 207] The lens-side microcomputer LPRS controls the zooming-lens driving motor ZMTR by the signals ZMF and ZMR in accordance with the zooming-lens drive instruction, thereby driving the zooming lens. Then, the process proceeds to Step 208. Incidentally, if it is determined in Step 206 that the zooming-lens drive instruction has not been sent, the process proceeds to Step 208 without passing through Step 207.

[Step 208] It is checked whether a lens-information read-out instruction has been sent from the microcomputer PRS. If the lens-information read-out instruction has been sent, the process proceeds to Step 209.

[Step 209] The lens-side microcomputer LPRS transmits, in accordance with predetermined communication rules, various lens information such as optical information on the zoom lens assembly L, the state of the autofocus/manual-focus selecting switch SWAM, position information on the focusing lens or position information on the zooming lens. Then, the process proceeds to Step 210. Incidentally, if it is determined in Step 208 that the lens-information read-out instruction has not been sent, the process proceeds to Step 210 without passing through Step 209.

[Step 210] It is checked whether the lens-side microcomputer LPRS is enabled to accept an operating instruction from the telephoto-side zoom switch SWZT and the wide-angle-side zoom switch SWZW, by the microcomputer PRS. If the lens-side microcomputer LPRS is in an enabled state, the process proceeds to Step 211.

[Step 211] It is checked whether the telephoto-side zoom switch SWZT is on. If the telephoto-side zoom switch SWZT is on, the process proceeds to Step 212.

[Step 212] The lens-side microcomputer LPRS controls the zooming-lens driving motor ZMTR by the signals ZMF and ZMR, thereby driving the zooming lens toward the telephoto side. Then, the process returns to Step 211. As long as the telephoto-side zoom switch SWZT remains on, this state is continued. If it is determined in Step 211 that the telephoto-side zoom switch SWZT is off, the process proceeds to Step 213.

[Step 213] It is checked whether the wide-angle-side zoom switch SWZW is on. If the wide-angle-side zoom switch SWZW is on, the process proceeds to Step 214.

[Step 214] The lens-side microcomputer LPRS controls the zooming-lens driving motor ZMTR by the signals ZMF and ZMR, thereby driving the zooming lens toward the wide-angle side. Then, the process returns to Step 213. As long as the wide-angle-side zoom switch SWZW remains on, this state is continued. If it is determined in Step 213 that the wide-angle-side zoom switch SWZW is off, the process proceeds to Step 215.

[Step 215] The lens-side microcomputer LPRS stops the zooming-lens driving motor ZMTR by the signals ZMF and ZMR. Incidentally, if it is determined in Step 210 that the lens-side microcomputer LPRS is disabled from accepting an operating instruction from the telephoto-side zoom switch SWZT and the wide-angle-side zoom switch SWZW, by the microcomputer PRS, the process proceeds to Step 216 without passing through Steps 211 to 215.

[Step 216] It is checked whether the lens-side microcomputer LPRS is enabled to accept an operating instruction from the lens-position memory switch SWMM and the lens-position reproduction switch SWPL, by the microcomputer PRS. If the lens-side microcomputer LPRS is in an enabled state, the process proceeds to Step 217.

[Step 217] It is checked whether the lens-position reproduction switch SWPL is on. If the lens-position reproduction switch SWPL is off, the process proceeds to Step 218.

[Step 218] It is checked whether the lens-position memory switch SWMM is on. If the lens-position memory switch SWMM is off, the process returns to Step 202 and the same flow is repeated. If it is on, the process proceeds to Step 219.

[Step 219] The current lens position, i.e., the positions of the focusing lens and the position of the zooming lens, are memorized in a memory of the lens-side microcomputer LPRS. Then, the process returns to Step 218. As long as the lens-position memory switch SWMM remains on, this state is held and the process does not proceed to the next step.

If it is detected in Step 218 that the lens-position memory switch SWMM is off, the process returns to Step 202 and the same flow is repeated. After the lens position, i.e., the positions of the focusing lens and the position of the zooming lens, have been memorized in this manner, if it is detected in Step 217 that the lens-position reproduction switch SWPL is on, then the process proceeds to Step 220.

[Step 220] The lens-side microcomputer LPRS controls the zooming-lens driving motor ZMTR by the signals ZMF and ZMR, thereby driving the zooming lens to move toward the position of the zooming lens memorized in the memory of the lens-side microcomputer LPRS.

[Step 221] The lens-side microcomputer LPRS controls the focusing-lens driving motor LMTR by the signals LMF and LMR, thereby driving the focusing lens to move toward the position of the focusing lens memorized in the memory of the lens-side microcomputer LPRS. In this manner, the operation of reproducing the memorized lens position is ended.

After that, the process proceeds to Step 218, and the above-described flow is repeated. Incidentally, if it is determined in Step 216 that the lens-side microcomputer LPRS is disabled from accepting an operating instruction from the lens-position memory switch SWMM and the lens-position reproduction switch SWPL, by the microcomputer PRS, the process proceeds to Step 202 without passing through the flow of Steps 217 to 221.

The operation of the lens-side microcomputer LPRS is as described above.

According to the present embodiment, if a particular photographic mode is specified from among photographic modes which are individually designed for specific photographic conditions (in the embodiment, the portrait photography AE mode, the landscape photography AE mode and the close-up photography AE mode), the position of the zooming lens is automatically determined so that an angle of view which matches the specified photographic condition can be obtained. Accordingly, it is possible to achieve the advantage of easily taking a photograph which matches each of the photographic modes. Further, since it is possible to change the position of the zooming lens to an arbitrary position after the zooming lens has been automatically set to a predetermined position, it is also possible to realize an flexible, photographic operation which allows a photographer himself to determine a desired angle of view in accordance with each individual photographic condition.

Further, if the zoom multiple exposure mode is set, first, the program executes the operating control of first driving the zooming lens to move to the wide-angle end where a first exposure cycle is executed, secondly positioning the zooming lens at the middle between the wide-angle end and the telephoto end, at which middle a second exposure cycle is executed, thirdly driving the zooming lens to move to the telephoto end where a third exposure cycle is executed, and then executing film winding. Accordingly, it is possible to easily perform multiple exposure photography while changing the magnification of a subject to be photographed, i.e., to easily take a fantastic or nonrealistic photograph utilizing a special photographic effect, without forcing the photographer to perform a time-consuming operation.

Further, a depth of focus calculated on the basis of an aperture value which is determined is converted into a depth-of-field corresponding to the amount of movement of the focusing lens, and the depth-of-field is visually displayed on the display DSP by making use of a portion for displaying the amount of exposure compensation. Accordingly, even an inexperienced photographer can easily grasp an image of a depth-of-field state. Also, no cost increases since the depth-of-field is visually displayed by making use of the display DSP for displaying information relative to exposure, which is provided in nearly all types of cameras.

Further, in the case of photography of a photographic scene which is expected to occur with a certain degree of probability, the position of the focusing lens and the position of the zooming lens are memorized in the memory of the lens-side microcomputer LPRS by turning on the lens-position memory switch SWMM, and if the lens-position reproduction switch SWPL is turned on as required, these lenses are automatically moved to the respective positions memorized in the memory no matter where these lenses are positioned. Accordingly, it is possible to immediately execute photography based on intended lens positions without loss of time since the photographer does not need to perform a focusing or zooming operation each time an angle of view is to be changed. In other words, it is possible to realize photography which misses no shutter opportunity.

As described above, in accordance with the above-described embodiment, there is provided zooming controlling means for controlling driving means and moving the zooming lens to a predetermined position if an arbitrary one of photographic modes which are respectively designed for specific photographic conditions is specified by mode setting means. Accordingly, if an arbitrary one of the photographic modes which are respectively designed for the specific photographic conditions is specified by the mode setting means, zooming toward a predetermined position is automatically performed.

Accordingly, it is possible to determine an angle of view which matches a selected one of the specific photographic conditions without the need for the photographer to perform a particular operation each time the photographer selects a desired specific photographic condition.

The present embodiment is also provided with specifying means for specifying a multiple exposure mode for performing multiple exposure while changing the position of the zooming lens and multiple exposure executing means for controlling, if the multiple exposure mode is specified by the specifying means and a release operation is performed in this specified state, the driving means and exposure controlling means to execute multiple exposure by automatically continuously exposing the same photosensitive portion to images corresponding to different zoom positions. Accordingly, if the multiple exposure mode for performing multiple exposure while changing the position of the zooming lens is specified, multiple exposure is executed by automatically continuously exposing the same photosensitive portion to images corresponding to different zoom positions. For example, the multiple exposure operation of performing a first exposure cycle with the zooming lens positioned on a long focal-length side and then performing a second exposure cycle with the zooming lens positioned on a short focal-length side can be automatically carried out.

Accordingly, it is possible to easily realize photography utilizing a special photographic effect without forcing the photographer to perform a complicated operation.

The present embodiment is also provided with computing means for calculating a depth of focus from an aperture value which is determined, converting means for converting the depth of focus calculated by the computing means into a depth-of-field corresponding to the amount of movement of the focusing lens, and display means for visually displaying the depth-of-field provided by the conversion executed by the converting means. The display means for visually displaying the depth-of-field provided by the conversion executed by the converting means is also used as display means for displaying the amount of exposure compensation.

Accordingly, even an inexperienced photographer can easily grasp an image of a depth-of-field state.

The present embodiment is also provided with first operating means for inputting an instruction to memorize the lens positions of the respective focusing and zooming lenses, second operating means for inputting an instruction to move the focusing and zooming lenses to the respective lens positions memorized in memory means, and operation controlling means for causing the memory means to memorize detection results respectively provided by first and second detecting means, in response to an operation of the first operating means, and for controlling first and second driving means on the basis of the respective lens positions memorized in the memory means in response to an operation of the second operating means. Accordingly, when the first operating means is operated, the lens positions of the respective focusing and zooming lenses, which are detected by the first and second detecting means, are memorized in the memory means, and when the second operating means is operated, the first and second driving means are controlled to automatically move the focusing and zooming lenses to the respective lens positions memorized in the memory means.

Accordingly, it is possible to immediately execute photography based on intended focus and zoom positions without loss of time since the photographer does not need to perform a focusing or zooming operation each time an angle of view is to be changed.

What is claimed is:

1. A camera comprising:
   a lens optical system including a focusing lens;
   position detecting means for detecting a position of said focusing lens;
   computing means for calculating a depth relative to a focal plane from an aperture value which is determined;
   converting means for converting said depth relative to said focal plane into a depth-of-field expressed as an absolute value, on the basis of information indicative of said position of said focusing lens detected by said position detecting means and a focal length relative to said lens optical system; and electrical display means for displaying said depth-of-field, said electrical display means displaying an absolute value of a closest-distance end to said depth-of-field and an absolute value of an infinity end of said depth-of-field, wherein said electrical display means displays said information by commonly using display segments for displaying information changing exposure value.

2. A camera according to claim 1, wherein said electrical display means displays said absolute values of said depth-of-field by means of a length of an array-like display as well as positions of opposite ends of said array-like display.

3. A camera according to claim 1, wherein said information changing exposure value is information related to exposure compensation performed by exposure compensation means.

4. A camera comprising:

a lens optical system including a focusing lens;

position detecting means for detecting an in-focus position of said focusing lens;

computing means for computing depth-of-field information as an absolute value of the basis of information indicative of said in-focus position of said focusing lens detected by said position detecting means and information indicative of an aperture value which is determined;

electrical display means for displaying a depth-of-field on the basis of said depth-of-field information computed by said computing means, said display means displaying an absolute value of a closest-distance end of said depth-of-field and an absolute value of an infinity end of said depth-of-field, wherein said electrical display means displays said depth of field by commonly using display segments for displaying other camera information; and exposure compensating means for permitting exposure compensation to be performed in response to an operation of an operating member and wherein said other camera information is exposure compensation information.

5. A camera according to claim 4, wherein said electrical display means displays said absolute values of said depth-of-field by means of a length of an array-like display as well as positions of opposite ends of said array-like display.

6. A camera comprising:

focus detecting means for detecting a focus state of an object;

first computing means for computing an aperture value on the basis of a plurality of in-focus information obtained by said focus detecting means;

second computing means for computing depth of field information as an absolute value on the basis of information indicative of said plurality of in-focus information detected by said focus detecting means; and electrical display means for displaying a depth-of-field on the basis of said depth-of-field information computed by said second computing means, said display means displaying an absolute value of a closest-distance end of said depth-of-field and an absolute value of an infinity end of said depth-of-field.

7. A camera according to claim 6, wherein said electrical display means displays said absolute values of said depth-of-field by means of a length of an array-like display as well as positions of opposite ends of said array-like display.

8. A camera according to claim 6, further comprising exposure compensating means for permitting exposure compensation to be performed in response to an operation of an operating member.

9. A camera according to claim 8, wherein said electrical display means displays both said depth-of-field and said exposure compensation permitted by said exposure compensating means, by means of common display segments.

10. A camera comprising:

a lens optical system including a focusing lens;

computing means for calculating a depth from at least an aperture value which is determined; and electrical display means for displaying first information relative to said depth computed by said computing means, wherein said electrical display means displays said first information by commonly using display segments for displaying information changing exposure value.

11. A camera according to claim 10, wherein said electrical display means displays said first information by means of a length of an array-like display.

12. A camera according to claim 10, wherein said electrical display means displays both said first information and exposure compensation information by means of common display segments.

* * * * *

UNITED STATES PATENT AND TRADEMARK OFFICE
CERTIFICATE OF CORRECTION

PATENT NO. : 5,666,570

DATED : September 9, 1997

INVENTOR(S) : Ohsawa, Toshifumi

It is certified that error appears in the above-identified patent and that said Letters Patent are hereby corrected as shown below:

Col. 3, line 19, after "switch" insert -- SWPL. --.

Signed and Sealed this

Tenth Day of March, 1998

Attest:

BRUCE LEHMAN

Attesting Officer      Commissioner of Patents and Trademarks